United States Patent
Miyamoto et al.

(10) Patent No.: US 10,497,356 B2
(45) Date of Patent: Dec. 3, 2019

(54) DIRECTIONALITY CONTROL SYSTEM AND SOUND OUTPUT CONTROL METHOD

(71) Applicant: PANASONIC INTELLECTUAL PROPERTY MANAGEMENT CO., LTD., Osaka (JP)

(72) Inventors: Masanari Miyamoto, Fukuoka (JP); Hiroyuki Matsumoto, Fukuoka (JP); Ryouichi Yuge, Fukuoka (JP); Shintaro Yoshikuni, Fukuoka (JP); Toshimichi Tokuda, Fukuoka (JP); Naoya Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 15/572,047

(22) PCT Filed: Apr. 19, 2016

(86) PCT No.: PCT/JP2016/002082
§ 371 (c)(1),
(2) Date: Nov. 6, 2017

(87) PCT Pub. No.: WO2016/185668
PCT Pub. Date: Nov. 24, 2016

(65) Prior Publication Data
US 2018/0158446 A1    Jun. 7, 2018

(30) Foreign Application Priority Data

May 18, 2015   (JP) .................. 2015-101357
Jan. 14, 2016   (JP) .................. 2016-005378

(51) Int. Cl.
*G10K 11/178*   (2006.01)
*H04N 7/18*     (2006.01)
(Continued)

(52) U.S. Cl.
CPC .. *G10K 11/17827* (2018.01); *G10K 11/17885* (2018.01); *H04N 7/183* (2013.01);
(Continued)

(58) Field of Classification Search
CPC ..... G10K 2210/102; G10K 2210/3045; G10K 11/178; G10K 11/17827; H04R 2430/01;
(Continued)

(56) References Cited

U.S. PATENT DOCUMENTS 6,529,234 B2 *  3/2003  Urisaka .................. H04N 5/232
                                                  348/143
8,547,416 B2 * 10/2013  Ozawa ............... G06K 9/00234
                                                  348/14.16

(Continued)

FOREIGN PATENT DOCUMENTS

JP   2006011159 A  *  1/2006
JP   2006267174 A  * 10/2006  ........... G10K 11/175

(Continued)

OTHER PUBLICATIONS

International Search Report, dated Jul. 19, 2016 by the Japan Patent Office (JPO), in International Application No. PCT/JP2016/002082.

*Primary Examiner* — Davetta W Goins
*Assistant Examiner* — Kuassi A Ganmavo
(74) *Attorney, Agent, or Firm* — Greenblum & Bernstein, P.L.C.

(57) ABSTRACT

In a directionality control system, a camera device captures a video of image capture area. A microphone array device collects a sound in image capture area. A signal processing section detects a sound source of the sound in image capture area, which is collected by the microphone array device. In a case where the detected sound source is within a range of privacy area, an output control section controls the sound in image capture area, which is collected by the microphone array device and is output from speaker device.

19 Claims, 19 Drawing Sheets

(51) Int. Cl.
  *H04R 1/40* (2006.01)
  *H04R 3/00* (2006.01)
  *H04R 3/12* (2006.01)
  *H04R 29/00* (2006.01)
(52) U.S. Cl.
  CPC ............ *H04R 1/406* (2013.01); *H04R 3/005* (2013.01); *H04R 3/12* (2013.01); *H04R 29/002* (2013.01); *G10K 2210/102* (2013.01); *G10K 2210/12* (2013.01); *G10K 2210/3045* (2013.01); *H04R 2430/01* (2013.01); *H04R 2499/11* (2013.01)
(58) Field of Classification Search
  CPC .... H04R 2499/11; H04R 3/005; H04R 1/406; H04R 29/002; H04N 7/183; H04N 5/225
  See application file for complete search history.

(56) References Cited

U.S. PATENT DOCUMENTS

| | | | | |
|---|---|---|---|---|
| 2007/0223732 | A1* | 9/2007 | Mao | G10L 21/0208 381/92 |
| 2010/0254543 | A1* | 10/2010 | Kjolerbakken | H04R 1/406 381/92 |
| 2012/0316869 | A1* | 12/2012 | Xiang | H04K 1/02 704/226 |
| 2013/0282373 | A1* | 10/2013 | Visser | G10L 21/0208 704/233 |
| 2013/0315413 | A1* | 11/2013 | Yamakawa | G10K 11/175 381/73.1 |
| 2014/0086426 | A1* | 3/2014 | Yamakawa | G10K 11/175 381/73.1 |
| 2014/0376740 | A1* | 12/2014 | Shigenaga | G06F 21/60 381/92 |
| 2015/0199954 | A1* | 7/2015 | Ukai | G10K 11/175 381/73.1 |
| 2015/0256930 | A1* | 9/2015 | Yamakawa | H04R 3/002 704/205 |
| 2016/0156823 | A1* | 6/2016 | Yoshida | H04N 5/772 348/143 |
| 2016/0234356 | A1* | 8/2016 | Thomas | H05K 9/0069 |
| 2016/0277834 | A1* | 9/2016 | Hata | H04R 3/04 |

FOREIGN PATENT DOCUMENTS

| | | | |
|---|---|---|---|
| JP | 2008048374 | A * | 2/2008 |
| JP | 2008193196 | A * | 8/2008 |
| JP | 2009-239348 | | 10/2009 |
| JP | 2009239348 | A * | 10/2009 |
| JP | 2015-029241 | | 2/2015 |
| JP | 2015-082823 | | 4/2015 |

\* cited by examiner

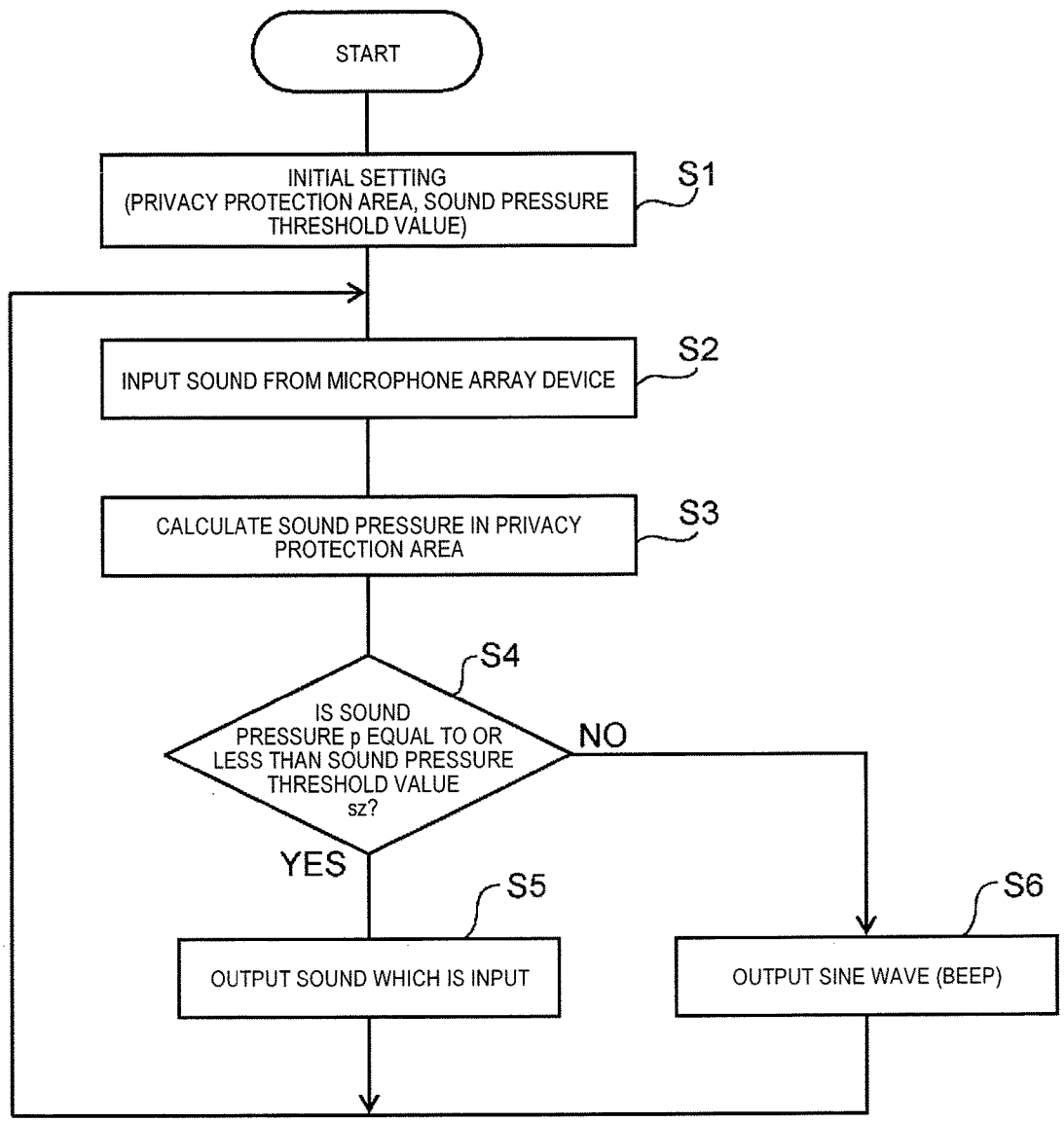

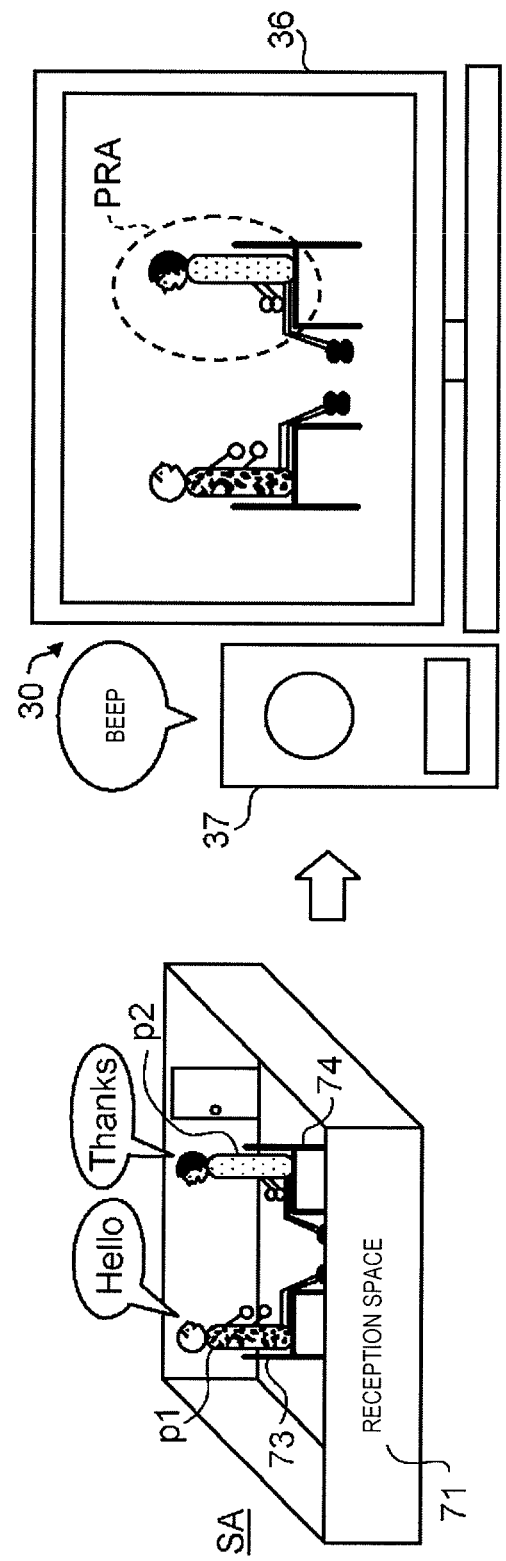

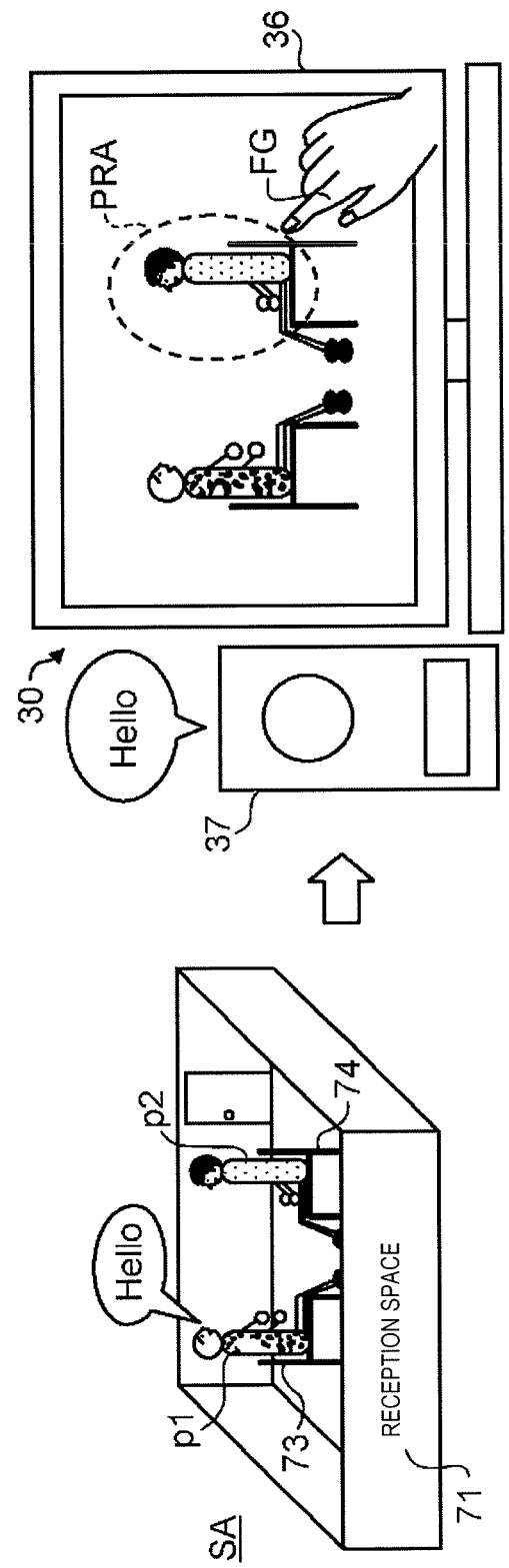

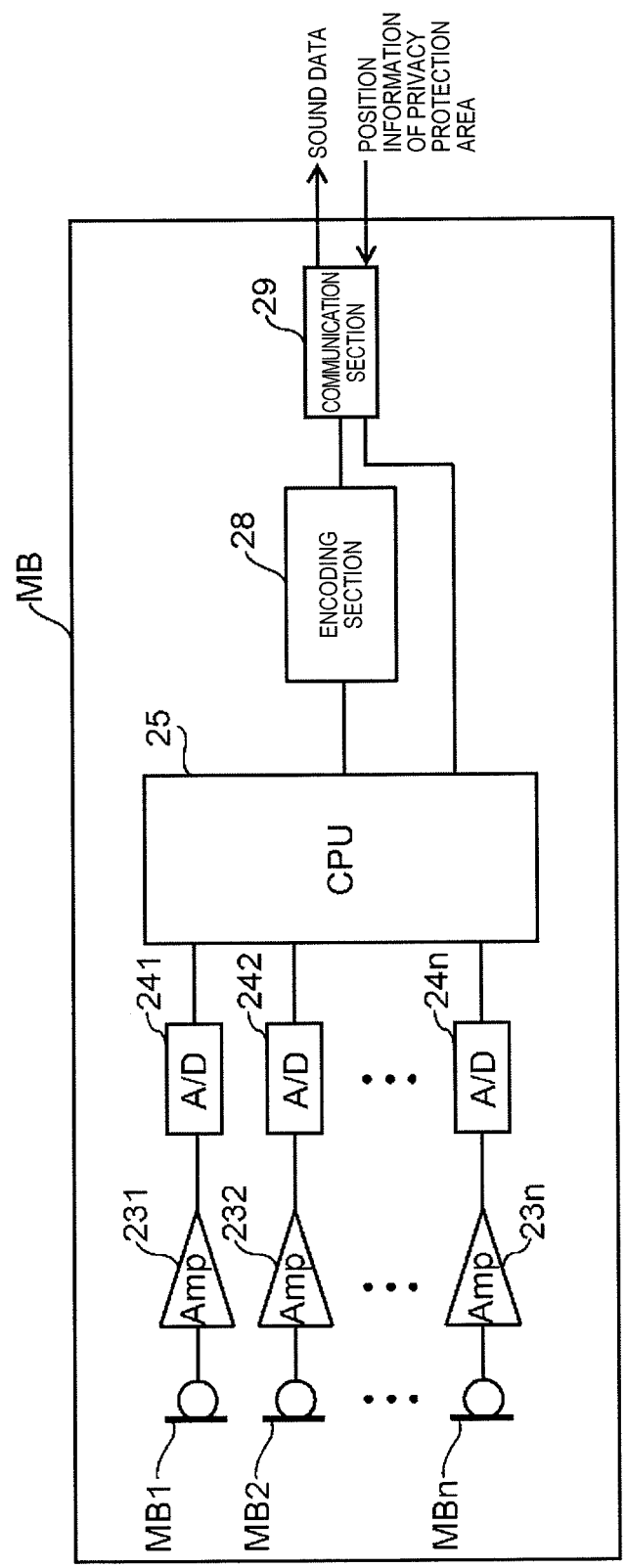

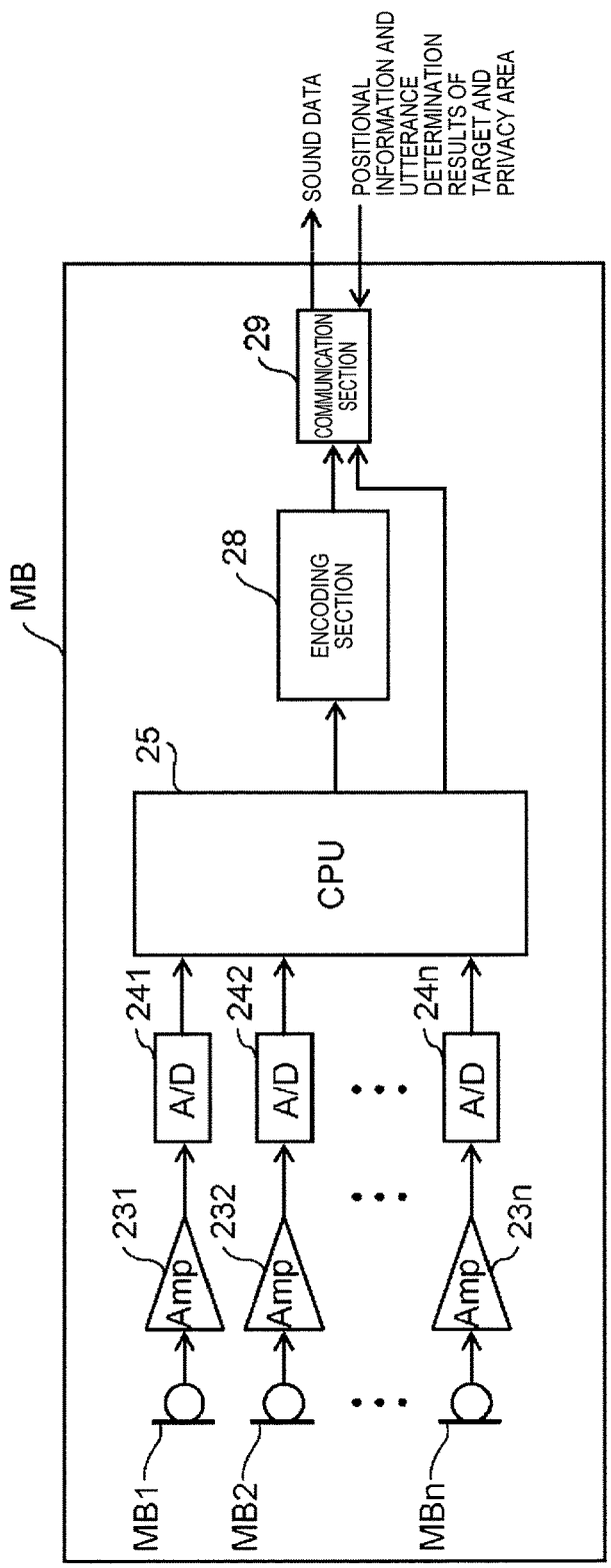

DIRECTIONALITY CONTROL SYSTEM AND SOUND OUTPUT CONTROL METHOD

TECHNICAL FIELD

The present disclosure relates to a directionality control system that controls the output of a sound collected, and a sound output control method.

BACKGROUND ART

For example, there has been known a directionality control system, disclosed in PTL 1, which forms directionality in a directing direction toward a sound collecting position of a sound from a microphone array device. The directionality control system of PTL 1 suppresses the output of sound data of the sound collected by the microphone array device in a case where a designated sound collecting position of the sound is within a range of a fixed privacy protection region (that is, a fixed area for protecting a person's privacy). Hereinafter, the privacy protection region will be briefly simply to as a "privacy area".

However, for example, in order to monitor a situation, in a case where a place, which is designated as a position where a sound is desired to be emphasized by forming directionality (hereinafter, referred to as a "target"), is a privacy area, the output of a sound is suppressed, or sound collecting is stopped. For example, when a point close to the privacy area is designated as a target, a sound within the privacy area is heard so as to leak into the sound of the target, which results in insufficiency of privacy protection of a person within the privacy area such as contents of a conversation being known by another person.

An object of this disclosure is to suppress a deterioration of the protection of a person's privacy without making another person know contents of a sound uttered by the person within a privacy area even when the sound is uttered by the person.

CITATION LIST

Patent Literature

PTL 1: Japanese Patent Unexamined Publication No. 2015-029241

SUMMARY OF THE INVENTION

A directionality control system of this disclosure includes an image capture section that is capable of imaging a video of an image capture area, a sound collecting section that collects a sound in the image capture area, a display section that displays video data in the image capture area which is captured by the image capture section, a sound output section that outputs the sound in the image capture area which is collected by the sound collecting section, a first memory that stores positional information of privacy area which is designated with respect to the video data of the image capture area which is displayed on the display section, a detection section that detects a sound source of the sound in the image capture area which is collected by the sound collecting section, and an output control section that controls output of the sound by the sound output section in the image capture area which is collected by the sound collecting section in a case where the sound source detected by the detection section is within a range of the privacy area.

Further, in the directionality control system of this disclosure, the first memory further stores positional information of a target designated with respect to the video data of the image capture area which is displayed on the display section, the detection section includes a sound emphasizing section that emphasizes a sound in a first direction toward the target from the sound collecting section and emphasizes a sound in a second direction toward the privacy area from the sound collecting section by using the pieces of positional information of the target and the privacy area, and an utterance determination section that determines whether or not utterance has occurred in each of the target and the privacy area, on the basis of the sound in the first direction and the sound in the second direction which are emphasized by the sound emphasizing section, and the output control section controls output of the sound in the first direction in the sound output section into which the sound in the privacy area has leaked, in a case where utterance has occurred in the privacy area.

This disclosure provides a sound output control method in a directionality control system including an image capture section and a sound collecting section, the sound output control method including imaging a video of an image capture area by the image capture section, collecting a sound in the image capture area by the sound collecting section, storing positional information of privacy area, which is designated with respect to a display section on which the video data of the image capture area is displayed, in a first memory, detecting a sound source of the sound in the image capture area which is collected by the sound collecting section, and controlling output of the sound in the image capture area which is collected by the sound collecting section in a case where the detected sound source is within a range of the privacy area.

Further, the sound output control method of this disclosure further includes storing positional information of a target designated with respect to the display section on which the video data of the image capture area is displayed, in the first memory, in which the detecting of the sound source of the sound in the image capture area which is collected by the sound collecting section includes emphasizing a sound in a first direction toward the target from the sound collecting section and emphasizing a sound in a second direction toward the privacy area from the sound collecting section by using the pieces of positional information of the target and the privacy area which are stored in the first memory, and determining whether or not utterance has occurred in each of the target and the privacy area, on the basis of the emphasized sound in the first direction and the emphasized sound in the second direction, and in which output of the sound in the first direction into which the sound in the privacy area has leaked is controlled in a case where utterance has occurred in the privacy area, as the controlling of the output of the sound in the image capture area which is collected by the sound collecting section in a case where the detected sound source is within the range of the privacy area.

According to this disclosure, even when a sound is uttered by a person within a privacy area, it is possible to suppress a deterioration of the protection of the person's privacy without making another person know contents of the sound uttered by the person.

BRIEF DESCRIPTION OF DRAWINGS

FIG. 3 is a flow chart illustrating an example of a sound processing procedure of a directionality control device according to the first exemplary embodiment.

FIG. 4B is a diagram illustrating an example of a sound processing operation after the privacy area is designated.

FIG. 6A is a diagram illustrating an example of a sound processing operation before a privacy area is designated.

FIG. 7 is a block diagram illustrating an example of an internal configuration of a microphone array device in a modification example of the first or second exemplary embodiment.

FIG. 17 is a block diagram illustrating an example of an internal configuration of a microphone array device in a modification example according to the third exemplary embodiment.

DESCRIPTION OF EMBODIMENTS

Hereinafter, an exemplary embodiment (hereinafter, "this exemplary embodiment") specifically disclosing a directionality control system and a sound output control method will be described appropriately with reference to the accompanying drawings. However, unnecessarily detailed description may be omitted. For example, a detailed description of already known matters and repetition of substantially the same configuration may be omitted. This is for avoiding unnecessary redundancy in the following description to facilitate understanding by those skilled in the art. The accompanying drawings and the following description are provided for those skilled in the art to fully understand this disclosure, and it is not intended that the subject matter defined in the claims is limited by them.

The directionality control system according to this exemplary embodiment is used as a monitoring system (including a manned monitoring system and an unmanned monitoring system) which is installed at, for example, factories, companies, public facilities (for example, libraries or event halls), or stores (for example, retail stores or banks), but the installation place is not particularly limited. Hereinafter, a description will be given on the assumption that the directionality control system according to this exemplary embodiment is installed within, for example, a store in order to facilitate the understanding of a description of this exemplary embodiment.

(Definition of Terms)

In addition, in this exemplary embodiment, a "user" refers to a person who operates directionality control device 30B, and is a main body who monitors conditions (for example, conditions of service to customers by a sales clerk) of an image capture area (for example, a store) or a sound collecting area (for example, a store). A "privacy area" refers to an area within the image capture area or the sound collecting area, and is a fixed area for protecting the privacy of a person (for example, a customer in a store).

(First Exemplary Embodiment)

Figure 1:
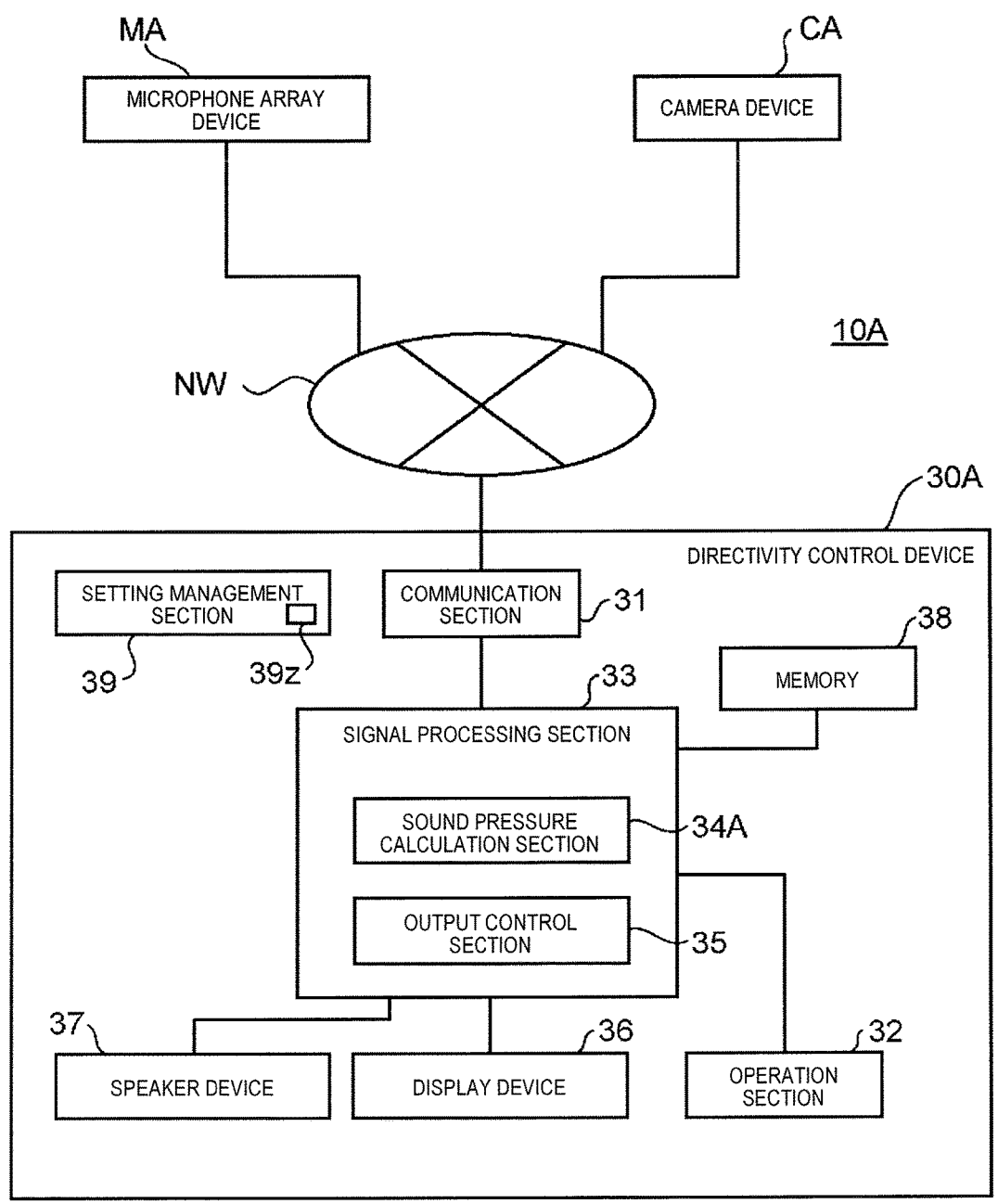
FIG. 1 is a block diagram illustrating an example of an internal configuration of a directionality control system according to a first exemplary embodiment.

FIG. 1 is a block diagram illustrating a configuration of directionality control system 10A according to a first exemplary embodiment. Directionality control system 10A is configured to include camera device CA, microphone array device MA, and directionality control device 30A. Camera device CA, microphone array device MA, and directionality control device 30A are connected to each other so as to be capable of communicating data with each other through network NW. Network NW may be a wired network (for example, the Intranet or the Internet), or may be a wireless network (for example, a wireless Local Area Network (LAN)).

Camera device CA as an example of an image capture section is, for example, an omnidirectional camera installed on an indoor ceiling, and functions as a monitoring camera capable of capturing an image of an image capture space (image capture area) where the device is installed. Camera device CA is not limited to the omnidirectional camera, and may be a fixed camera having a fixed angle of view, or may be a Pan Tilt Zoom (PTZ) camera capable of performing panning, tilting, and zooming operations. Camera device CA stores a time (that is, an image capture time) when a video is captured in association with video data, and transmits the video data including data of the image capture time to directionality control device 30A through network NW.

Microphone array device MA as an example of a sound collecting section is, for example, an omnidirectional microphone array device installed on an indoor ceiling, and collects an omnidirectional sound in a sound collecting space (sound collecting area) where the device is installed. Here, the image capture area and the sound collecting area are substantially the same. Microphone array device MA has a housing having an opening formed in the center thereof, and further includes a plurality of microphone units that are concentrically disposed along a circumferential direction in the vicinity of the opening.

Examples of the microphone unit (hereinafter, simply referred to as a microphone) to be used include a high sound quality small-sized Electret Condenser Microphone (ECM).

Microphone array device MA stores collected sound data in association with a time when the sound collecting is performed (that is, a sound collecting time), and transmits sound data including data of the sound collecting time to directionality control device 30A through network NW.

Directionality control device 30A, which is, for example, a stationary Personal Computer (PC) which is installed in a place other than the inside in which microphone array device MA and camera device CA are installed, forms directionality with respect to an omnidirectional sound collected by microphone array device MA, and emphasizes the sound in the directing direction. Directionality control device 30A detects and estimates the position of a sound source (hereinafter, also referred to as a "sound position") within the image capture area, and performs predetermined mask processing in a case where the estimated position of the sound source is within the range of a privacy area. Details of the mask processing will be described later. Directionality control device 30A may be a communication terminal such as a mobile phone, a tablet terminal, or a smartphone, instead of a PC.

Directionality control device 30A is configured to include at least communication section 31, operation section 32, signal processing section 33, display device 36, speaker device 37, memory 38, and setting management section 39. Signal processing section 33 includes sound pressure calculation section 34A and output control section 35.

Setting management section 39 as an example of a positional information setting section converts coordinates of a privacy area designated by a user into coordinates indicating a directing direction toward a sound area corresponding to the privacy area from microphone array device MA, with respect to display device 36 on which a video captured by camera device CA is displayed, as initial setting. In this conversion process, setting management section 39 calculates coordinates (θMAh, θMAv) indicating a directing direction toward the sound area corresponding to the privacy area from microphone array device MA in accordance with the designation of the privacy area.

Details of this coordinate calculation process are disclosed in, for example, PTL 1. Here, θMAh denotes a horizontal angle in the directing direction toward the sound position from microphone array device MA, and θMAv denotes a vertical angle in the directing direction toward the sound position from microphone array device MA. The sound position is an actual position corresponding to a designated position designated using a user's finger or a stylus pen by operation section 32 in video data displayed on display device 36. This conversion process may be performed by signal processing section 33.

Setting management section 39 includes memory 39z as an example of a first memory, and stores positional coordinates of the position of the privacy area designated by the user with respect to display device 36 on which a video captured by camera device CA is displayed and coordinates indicating the directing direction toward the sound area corresponding to the converted privacy area in memory 39z.

Further, setting management section 39 sets sound pressure threshold value sh compared with sound pressure p of the sound collected by microphone array device MA in memory 39z. Here, sound pressure p indicates the magnitude of the sound collected by microphone array device MA, and is distinguished from a sound volume indicating the magnitude of a sound which is output from speaker device 37. Sound pressure threshold value sh is set to, for example, a value by which a user cannot hear the sound which is collected by microphone array device MA and is output from speaker device 37 or contents of the sound cannot be known even when the user can hear the sound.

Communication section 31 receives the video data including the data of the image capture time which is transmitted by camera device CA and the sound data including the data of the sound collecting time which is transmitted by microphone array device MA, and outputs the received data to signal processing section 33.

Operation section 32 is a user interface (UI) for notifying signal processing section 33 of contents of the user's input operation, and is constituted by a pointing device such as a mouse or a keyboard. For example, operation section 32 is disposed corresponding to a screen of display device 36, and may be constituted by a touch panel or a touch pad capable of performing an input operation by using the user's finger or a stylus pen.

Operation section 32 designates privacy area PRA (in the drawing, a dotted frame) which is an area for which the user desires to apply privacy protection in the video data (see FIG. 4A) of camera device CA displayed on display device 36, acquires coordinate data indicating the position of the designated privacy area, and outputs the acquired coordinate data to signal processing section 33.

Memory 38 is constituted by, for example, a Random Access Memory (RAM), and functions as a program memory, a data memory, and a work memory during the operation of directionality control device 30A. Memory 38 as an example of a second memory stores the sound data of the sound collected by microphone array device MA together with the sound collecting time. Signal processing section 33 determines whether or not the sound collected by microphone array device MA has been detected within the privacy area by using the sound data stored in memory 38. Therefore, the sound is reproduced with a slight delay from the sound collecting time (a slight delay from real time) of the sound collected by microphone array device MA. This delay time is a time required for a process of collecting a sound by microphone array device MA and then determining whether or not the sound has been detected within the privacy area. The sound data is once stored in memory 38, and thus signal processing section 33 can control the output of a sound which is collected a predetermined time before the time when the sound is detected from privacy area PRA and is stored in memory 38, as described later. In this manner, memory 38 also functions as a buffer memory that temporarily stores sound data.

Signal processing section 33 is constituted by, for example, a Central Processing Unit (CPU), a Micro Processing Unit (MPU), or a Digital Signal Processor (DSP), and performs a control process for controlling the overall operation of sections of directionality control device 30A, a process of inputting and outputting data to and from other sections, a data computation (calculation) process, and a data storage process.

Signal processing section 33 as an example of a detection section determines whether or not the direction of the sound source is within the range of the privacy area in a case where the sound is collected by microphone array device MA. In this method, signal processing section 33 divides, for example, the image capture area into a plurality of blocks, forms the directionality of a sound for each block, determines whether or not there is a sound exceeding a fixed threshold value in the directing direction, and estimates a sound position within the image capture area. A method in signal processing section 33 estimates the sound position may be a method disclosed in, for example, literature of "a monograph "Localization of Multiple Sound Sources Based on CSP Analysis with a Microphone Array", Takanobu Nishiura and the like, The transactions of the Institute of Electronics, Information and Communication Engineers D-11, Vol. J83-D-11, No. 8, pp. 1713-1721, August 2000".

The method may be a method in which signal processing section 33 performs a process of forming directionality at a position within the privacy area with respect to the sound data collected by microphone array device MA and determines whether or not a sound has been detected in the directing direction. In this case, signal processing section 33 can determine whether or not the sound position is within the range of the privacy area, but the position is not specified even when the sound position is outside the privacy area.

Sound pressure calculation section 34A within signal processing section 33 calculates a sound pressure of a sound collected in privacy area PRA among the sounds collected by microphone array device MA.

Output control section 35 within signal processing section 33 controls the operations of camera device CA, microphone array device MA, display device 36, and speaker device 37, outputs the video data transmitted from camera device CA to display device 36, and outputs the sound data, which is transmitted from microphone array device MA, through speaker device 37. Output control section 35 performs a process of forming directionality by using the sound data collected by microphone array device MA and transmitted to directionality control device 30A, to thereby form the directionality of the sound data in a directing direction, corresponding to the coordinates (θMAh, θMAv) in the sound collecting direction, which is calculated by signal processing section 33.

Output control section 35 determines whether or not a sound position is included within privacy area PRA (see FIG. 4A) where a sound position is designated in advance, on the basis of the coordinate data indicating the calculated directing direction. Output control section 35 controls the output of the sound collected by microphone array device MA in a case where the output control section determines that the sound position is included within privacy area PRA and determines that sound pressure p within privacy area PRA which is calculated by sound pressure calculation section 34A exceeds sound pressure threshold value sh. For example, output control section 35 reproduces and outputs a predetermined substitute sound (for example, commonly referred to as a "beep"), instead of the sound collected by microphone array device MA. The beep is a sound having a sine wave such as 1 kHz, and data of the sound waveform is registered in the memory within output control section 35 in advance. The substitute sound is not limited to the "beep". The substitute sound may be a melody sound, a noise sound, or the like, or may be an announcement such as "sound is masked at the moment". That is, when a sound is output so that it is difficult to specify who has uttered the sound and to specify a person having uttered the sound, a method of controlling the output of the sound is not limited.

Display device 36 as an example of a display section displays the video data captured by camera device CA on a screen.

Speaker device 37 as an example of a sound output section outputs a sound of the sound data collected by microphone array device MA or the sound data collected by microphone array device MA for which directionality is formed in the directing direction (θMAh, θMAv) by signal processing section 33. Display device 36 and speaker device 37 may be configured as devices that are separate from directionality control device 30A.

Figure 2:
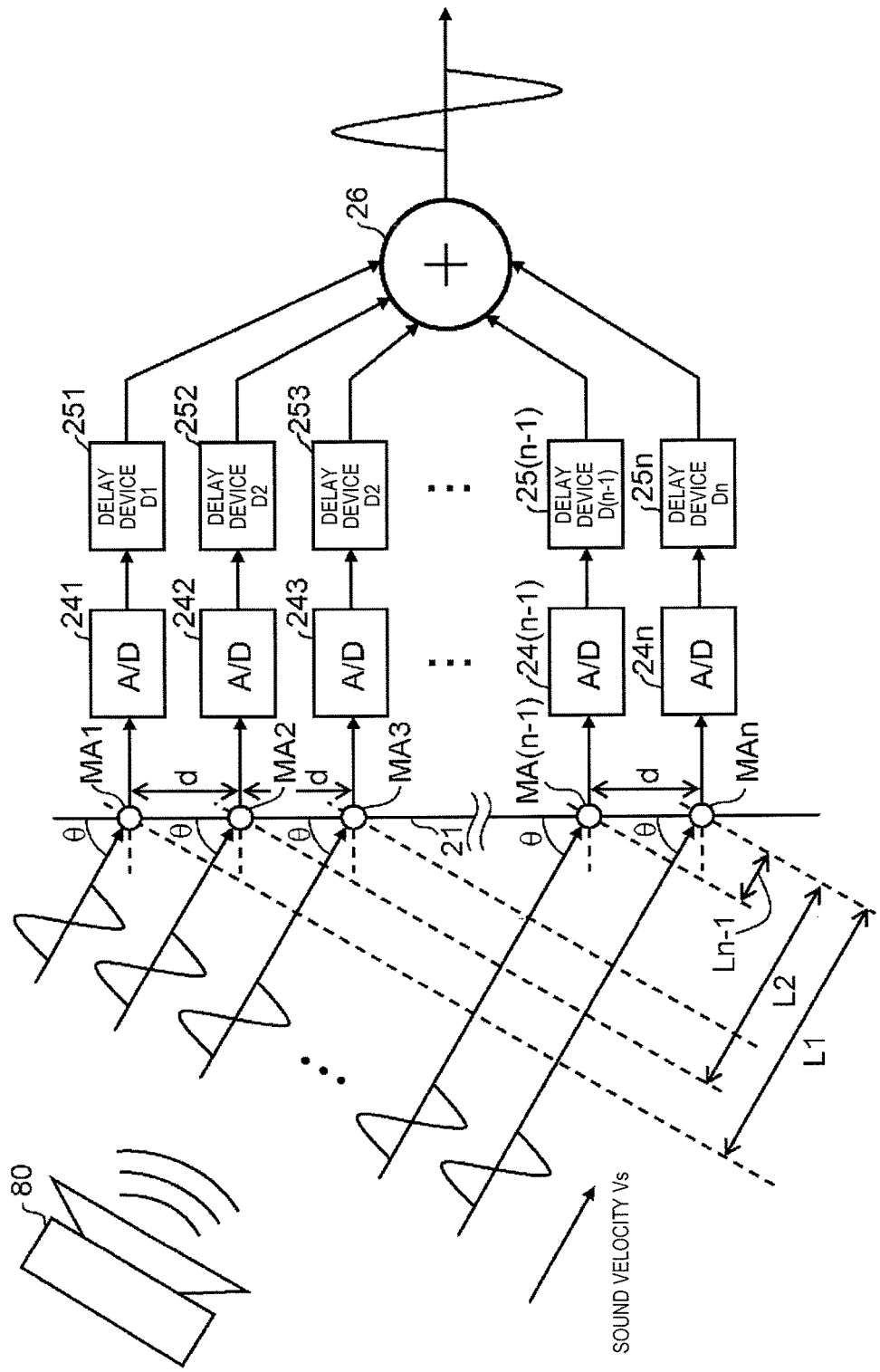
FIG. 2 is a diagram illustrating an example of a principle of the formation of directionality in a specific direction with respect to a sound collected by a microphone array device.

FIG. 2 is a diagram illustrating an example of a principle of the formation of directionality in a specific direction with respect to a sound collected by microphone array device MA. Directionality control device 30A adds pieces of sound data collected by respective microphones MA1 to MAn through a directionality control process for sound data by using the sound data transmitted from microphone array device MA, and generates sound data for which directionality is formed in a specific direction in order to emphasize (amplifies) a sound (sound volume level) in the specific direction from the positions of respective microphones MA1 to MAn of microphone array device MA. The specific direction refers to a direction toward a sound position designated by operation section 32 from microphone array device MA. A technique related to a directionality control process for sound data for forming the directionality of a sound collected by microphone array device MA is a known technique as disclosed in, for example, Japanese Patent Unexamined Publication No. 2014-143678, Japanese Patent Unexamined Publication No. 2015-029241 (PTL 1), and the like.

In FIG. 2, microphones are one-dimensionally arranged on a straight line for convenience of description. In this case, directionality is in a two-dimensional space within a plane, but the same processing method may be performed by two-dimensionally arranging the microphones in order to form directionality in a three-dimensional space.

A sound wave emitted from sound source 80 is incident at a certain fixed angle (incident angle=(90-θ) [degrees]) with respect to microphones MA1, MA2, MA3 to MA (n-1), and MAn built in microphone array device MA. Incident angle θ may be horizontal angle θMAh or vertical angle θMAv in a directing direction toward a sound position from microphone array device MA.

Sound source 80 is, for example, a conversation of a person, being a subject of camera device CA who is present in a sound collecting direction, which is collected by microphone array device MA, and is present in a direction at predetermined angle θ on the surface of housing 21 of microphone array device MA. Interval d between microphones MA1, MA2, MA3, . . . , MA (n-1), and MAn is fixed.

The sound wave emitted from sound source 80 first reaches microphone MA1 to be collected, and then reaches microphone MA2 to be collected. The sound wave is collected one after another, and finally reaches microphone MAn to be collected.

Microphone array device MA performs AD conversion from pieces of analog sound data collected by respective microphones MA1, MA2, MA3, . . . , MA (n-1), and MAn into digital sound data in A/D converters 241, 242, 243 to 24 (n-1), and 24n.

Microphone array device MA applies a delay time corresponding to a difference in arrival time in microphones MA1, MA2, MA3, . . . , MA (n-1), and MAn to arrange phases of all sound waves in respective delay devices 251, 252, 253 to 25 (n-1), and 25n, and then adds sound data after delay processing in adder 26. Thereby, microphone array device MA can form the directionality of sound data in a direction at predetermined angle θ in microphones MA1, MA2, MA3, . . . , MA (n-1), and MAn, and can obtain sound data 27 after emphasis processing.

In this manner, microphone array device MA can easily form the directionality of collected sound data by changing delay times D1, D2, D3 to Dn−1, and Dn that are set in respective delay devices 251, 252, 253 to 25 (n−1), and 25n. It is also possible to realize the formation of directionality of sound data (that is, emphasis processing in a specific direction of sound data) in directionality control device 30A. In this case, directionality control device 30A may include at least delay devices 251, 252, . . . , 25 (n−1), and 25n and adder 26 illustrated in FIG. 2. That is, directionality control device 30A may apply a delay time corresponding to a difference in arrival time in microphones MA1, MA2, MA3, . . . , MA (n−1), and MAn to arrange phases of all sound waves, and may then add sound data after delay processing in adder 26.

The operation of directionality control system 10A having the above-described configuration will be described.

FIG. 3 is a flow chart illustrating an example of a sound processing procedure of directionality control device 30A according to the first exemplary embodiment. In FIG. 3, first, setting management section 39 within directionality control device 30A performs initial setting (S1). In this initial setting, a user designates privacy area PRA (see FIG. 4A) so as to surround the privacy area by a dotted frame by using the user's finger FG or a stylus pen with respect to display device 36 on which video data of a video captured by camera device CA is displayed.

Setting management section 39 converts coordinates of the designated privacy area PRA into coordinates indicating a directing direction toward a sound area corresponding to the privacy area from microphone array device MA. Further, setting management section 39 sets sound pressure threshold value sh to be compared with sound pressure p collected by microphone array device MA. As described above, sound pressure threshold value sh is set to a value by which the user cannot hear the sound which is collected by microphone array device MA and is output from speaker device 37 or contents of the sound cannot be known even when the user can hear the sound.

Communication section 31 receives the sound data which is output from microphone array device MA, and inputs the received sound data (S2). Signal processing section 33 determines whether or not a sound source of the sound collected by microphone array device MA is within privacy area PRA. In a case where it is determined that the sound source is within the privacy area, sound pressure calculation section 34A calculates the sound pressure thereof (S3). Here, the determination of whether or not the sound source of the sound collected by microphone array device MA is within privacy area PRA is performed using any of the above-described methods.

Output control section 35 compares sound pressure p calculated by sound pressure calculation section 34A and sound pressure threshold value sz stored in memory 39z within setting management section 39 with each other to determine whether or not sound pressure p is equal to or less than sound pressure threshold value sz (S4). In a case where sound pressure p is equal to or less than sound pressure threshold value sz, output control section 35 outputs the sound collected by microphone array device MA from speaker device 37 as it is (S5, see FIG. 4A). Thereafter, directionality control device 30A returns to the process of step S2.

On the other hand, in a case where sound pressure p exceeds sound pressure threshold value sz in step S4, output control section 35 outputs a beep (for example, a sound having a sine wave of 1 kHz) which is a substitute sound for the sound collected by microphone array device MA from speaker device 37 (S6, see FIG. 4B). Thereafter, directionality control device 30A returns to the process of step S2.

Figure 4A:
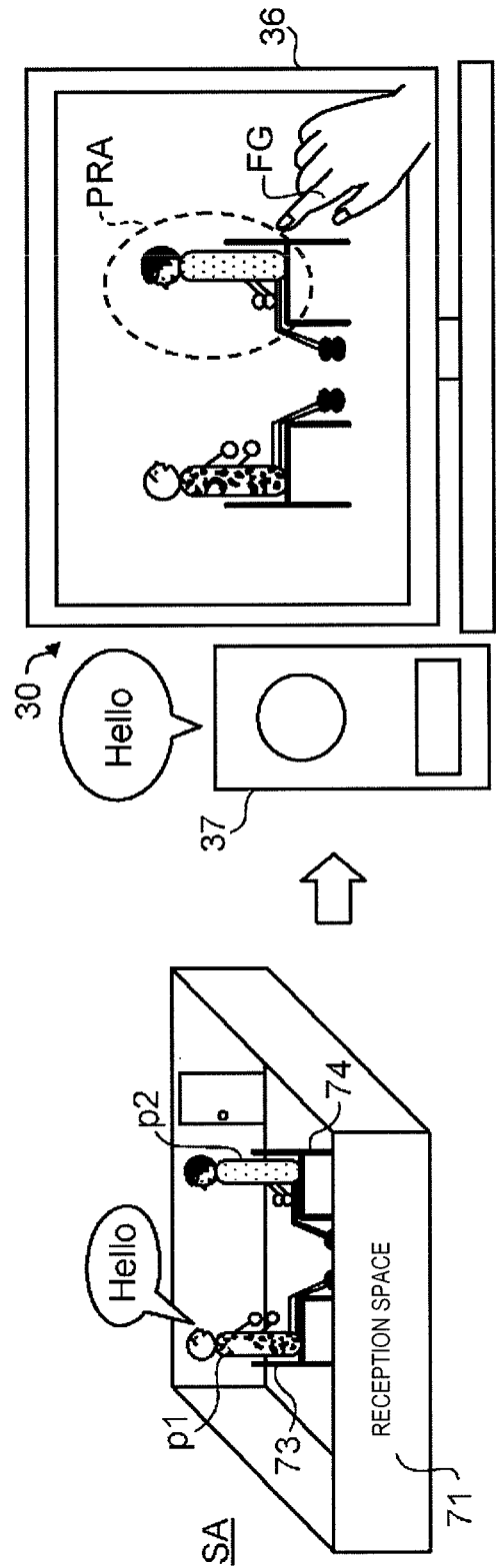
FIG. 4A is a diagram illustrating an example of a sound processing operation before a privacy area is designated.

FIG. 4A is a diagram illustrating an example of a sound processing operation before privacy area PRA is designated. Image capture area SA captured by camera device CA is inside reception space 71. In reception space 71, two persons p1 and p2 have a conversation while facing each other in a state where the two persons sit on respective chairs 73 and 74. A sound of "Hello" collected by microphone array device MA and uttered by person p1 is output from speaker device 37 of directionality control device 30A. The user designates privacy area PRA so as to trace the screen using finger FG with respect to the video captured by camera device CA which is displayed on the screen of display device 36 of directionality control device 30A. Here, privacy area PRA is designated so as to surround person p2. The designation of the privacy area is not limited thereto, and may be performed by directly inputting positional coordinates indicating a range from the keyboard, or may be performed through image processing in which a specific face image shown in a video is recognized and a range surrounding the face image is set.

FIG. 4B is a diagram illustrating an example of a sound processing operation after privacy area PRA is designated. When setting management section 39 stores the positional coordinates of privacy area PRA designated by the user in memory 39z, privacy area PRA is set with respect to image capture area SA. In reception space 71, person p1 utters a sound of "Hello", and person p2 utters a sound of "Thanks". Since person p2 is within privacy area PRA, a sound collected by microphone array device MA is subjected to mask processing in a period for which person p2 utters a sound, and only a "beep" reproduced by output control section 35 is output from speaker device 37.

As described above, in directionality control system 10A according to this exemplary embodiment, camera device CA captures a video of image capture area SA. Microphone array device MA collects a sound in image capture area SA. Display device 36 displays video data of image capture area SA captured by camera device CA. Speaker device 37 outputs a sound in image capture area SA which is collected by microphone array device MA. Setting management section 39 stores positional information of privacy area PRA, which is designated with respect to the video data of the video area displayed on display device 36, in memory 39z.

Signal processing section 33 detects a sound source of a sound in image capture area SA which is collected by microphone array device MA. In a case where the detected sound source is within the range of privacy area PRA, output control section 35 controls the sound in image capture area SA which is collected by microphone array device MA and is output from speaker device 37. Therefore, a beep being a substitute sound is output from speaker device 37 while (period) sound pressure p collected by microphone array device MA exceeds sound pressure threshold value sz.

Thereby, in a case where utterance has occurred within privacy area PRA in image capture area SA captured by camera device CA, the entire sound collected by microphone array device MA changes to a substitute sound ("beep") during the period, and thus it is not possible to know contents of all of the sounds uttered within image capture area SA inclusive of privacy area PRA. Thereby, even when a sound is uttered within the privacy area, the contents thereof are not known by another person, and thus it is possible to improve privacy protection. The "beep" which is a substitute sound is a sound which is often used also in TV broadcasting, and thus a user having heard the sound can easily know that the sound is concealed (mask processing).

In a case where the sound pressure of the sound in image capture area SA which is collected by microphone array device MA exceeds sound pressure threshold value sh when the detected sound source is within the range of privacy area PRA, output control section 35 controls output in speaker device 37 through mask processing. On the other hand, in a case where the sound pressure of the sound in image capture area SA which is collected by microphone array device MA does not exceed sound pressure threshold value sh, output control section 35 does not control the output in speaker device 37 through mask processing.

Thereby, in a case where the sound pressure is low even when the sound is uttered within the range of privacy area PRA, the sound is output as it is without controlling the output of the sound through mask processing, and thus it is possible to reduce unnecessary processing and to reduce a processing load.

Output control section 35 outputs the sound collected by microphone array device MA from speaker device 37 instead of a substitute sound. Since the entire sound within image capture area SA changes to a substitute sound (beep), it is also difficult to presume contents of a conversation from a sound uttered from a person (here, the person p1) which is separated from the privacy area, thereby increasing confidentiality.

Setting management section 39 within directionality control device 30A sets positional coordinates based on a designation operation to be positional information of the designated privacy area when receiving the designation operation for privacy area PRA from operation section 32. For example, privacy area PRA is designated so as to trace the screen using finger FG with respect to the video captured by camera device CA, and thus the user can arbitrarily set the privacy area.

Signal processing section 33 stores a sound in image capture area SA which is collected by microphone array device MA in memory 38 together with a sound collecting time. Output control section 35 controls the output of the sound, which is stored in memory 38, from speaker device 37 from a time a predetermined time before the detection of a sound source in a case where the sound source detected by signal processing section 33 is within the range of privacy area PRA.

Since the output of the sound is controlled from a time the predetermined time before the detection of the sound from privacy area PRA, it is possible to prevent a beginning portion (opening portion) of the sound within the privacy area from being output without being subjected to mask processing for a short period of time (for example, for several seconds of approximately three seconds) which is required for processing from the detection of the sound to the output of the substitute sound. Therefore, it is also possible to avoid contents being presumed from the beginning portion of the sound. This case is effective in post reproduction in which collected sound data is once stored in the memory and is then reproduced, or in a case where a sound is reproduced with a slight delay (a delay from real time) from the sound collecting time of the sound collected by microphone array device MA. The predetermined time is a short period of time (for example, for several seconds of approximately three seconds) which is required from when microphone array device MA collects a sound to when it is determined whether or not the sound has been detected within the privacy area.

(Second Exemplary Embodiment)

In the above-described first exemplary embodiment, a description has been given of a case where a beep is output as a substitute sound for all sounds detected within an image capture area in a case where a sound is uttered in a privacy area. However, in a second exemplary embodiment, a description will be given of a case where all sounds are erased (muted) to be in an anacoustic state in a case where a sound is uttered in a privacy area.

Since a hardware configuration of a directionality control system in the second exemplary embodiment is the same as that in the above-described first exemplary embodiment, the same reference numerals and signs are used, and thus a description thereof will not be repeated.

Figure 5:
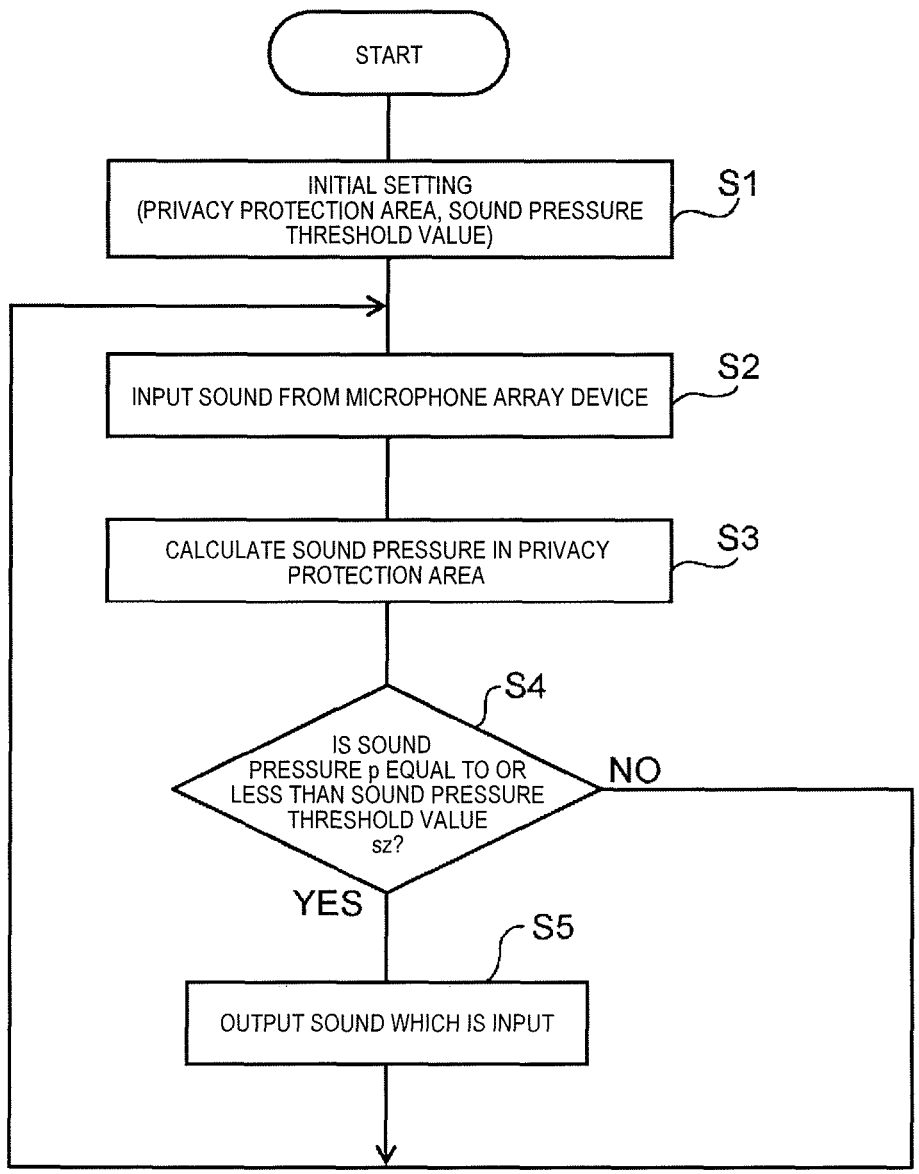
FIG. 5 is a flow chart illustrating an example of a sound processing procedure of a directionality control device according to a second exemplary embodiment.

FIG. 5 is a flow chart illustrating an example of a sound processing procedure of directionality control device 30A according to the second exemplary embodiment. The same step processes as those in the above-described first exemplary embodiment are denoted by the same step numbers, and thus a description thereof will not be repeated.

In FIG. 5, output control section 35 compares sound pressure p calculated by sound pressure calculation section 34A and sound pressure threshold value sz stored in memory 39z within setting management section 39 with each other in step S4, and outputs nothing, that is, erases (mutes) a sound to set an anacoustic state in a case where sound pressure p exceeds sound pressure threshold value sz. Thereafter, directionality control device 30A returns to the process of step S2. In the above-described first exemplary embodiment, in a case where sound pressure p exceeds sound pressure threshold value sz, a beep which is a substitute sound for a sound collected by microphone array device MA is output from speaker device 37.

FIG. 6A is a diagram illustrating an example of a sound processing operation before privacy area PRA is designated. Similarly to FIG. 4A, in reception space 71 inside image capture area SA, two persons p1 and p2 have a conversation while facing each other in a state where the two persons sit on respective chairs 73 and 74. A sound of "Hello" uttered by person p1 is output from speaker device 37 of directionality control device 30A. A user designates privacy area PRA so as to trace a screen using finger FG or a stylus pen with respect to a video captured by camera device CA which is displayed on the screen of display device 36 of directionality control device 30A. Here, privacy area PRA is designated so as to surround person p2.

Figure 6B:
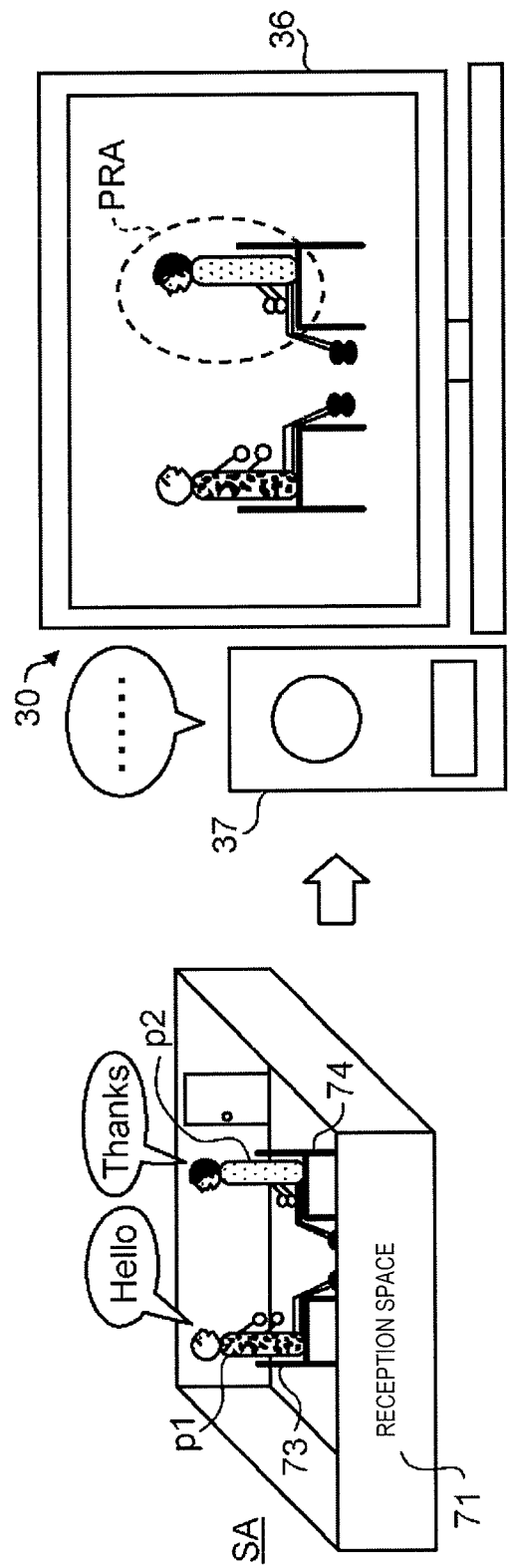
FIG. 6B is a diagram illustrating an example of a sound processing operation after the privacy area is designated.

FIG. 6B is a diagram illustrating an example of a sound processing operation after privacy area PRA is designated. When setting management section 39 stores the coordinates of privacy area PRA designated by the user in memory 39z, privacy area PRA is set with respect to image capture area SA. In reception space 71, person p1 utters a sound of "Hello", and person p2 utters a sound of "Thanks". Since person p2 is within privacy area PRA, a sound being reproduced through speaker device 37 is stopped to be muted in a period of time for which person p2 utters a sound.

As described above, in directionality control system 10A according to this exemplary embodiment, the output of all sounds within image capture area SA which are collected by microphone array device MA is interrupted for the period of time in a case where utterance has occurred within privacy area PRA. Thereby, a sound uttered from privacy area PRA is not also heard (that is, an anacoustic state is set).

When the output of a sound is restricted, a sound pressure may be reduced to a predetermined sound pressure, for example, 1/10, instead of performing anacoustic processing. The sound pressure is reduced, and thus it is not possible to know the contents of a sound even when the sound is slightly heard from privacy area PRA. Therefore, privacy protection of a person within privacy area PRA can be improved, and thus it is possible to suppress a deterioration of the privacy of the person within privacy area PRA.

(Modification Example of Exemplary Embodiments)

In the above-described exemplary embodiments, a directionality control device stores positional information (that is, positional coordinates) of a privacy area, and a beep is output as a substitute sound or anacoustic processing is set in a case where a detected sound position is included in the privacy area. In a modification example of each exemplary embodiment (hereinafter, simply referred to as a "modification example"), a description will be given of a case where these processes are performed by a microphone array device instead of the directionality control device.

FIG. 7 is a block diagram illustrating an example of an internal configuration of microphone array device MB in a modification example of the first or second exemplary embodiment. In microphone array device MB according to the modification example, the same components as those in microphone array devices MA in the above-described first and second exemplary embodiments are denoted by the same reference numerals and signs, and thus a description thereof will not be repeated.

Microphone array device MB includes plurality of microphones MB1, MB2, . . . , and MBn, amplifiers 231, 232, . . . , and 23n, A/D converters 241, 242, 243, . . . , and 24n, CPU 25, encoding section 28, and communication section 29.

Amplifiers 231, 232, . . . , and 23n amplify sound signals collected by plurality of microphones MB1, MB2, . . . , and MBn. A/D converters 241, 242, 243, . . . , and 24n convert the sound signals amplified by respective amplifiers 231, 232, . . . , and 23n into digital sound data.

CPU 25 collects sounds by plurality of microphones MB1, MB2, . . . , and MBn, inputs the pieces of sound data converted by A/D converters 241, 242, 243, . . . , and 24n, and performs sound output processing on the basis of the pieces of sound data. CPU 25 stores positional information (that is, positional coordinates) of privacy area PRA which is received through communication section 29 in an internal memory. CPU 25 detects the position of a sound uttered within image capture area SA, and performs the above-described mask processing (the output of a "beep" or the anacoustic processing) on the sounds of the pieces of sound data collected by microphones MB1, MB2, . . . , and MBn and converted by A/D converters 241, 242, 243, . . . , and 24n in a case where the detected sound position matches the positional coordinates within privacy area PRA.

Encoding section 28 encodes the sound data which is output from CPU 25 to generate a sound packet capable of being transmitted through network NW. Communication section 29 transmits the sound data encoded by encoding section 28 to directionality control device 30A through network NW, and receives positional information of privacy area PRA which is transmitted from directionality control device 30A through network NW.

As described above, microphone array device MB according to the modification example stores collected sound data in association with a time when sound collecting is performed (sound collecting time), and transmits the stored sound data and data of the sound collecting time to directionality control device 30A through network NW. Microphone array device MB determines whether or not a sound position of the collected sound data matches positional information of privacy area PRA, and outputs a beep as a substitute sound or performs anacoustic processing in a case where the sound position is included in privacy area PRA. Similarly to the above-described first exemplary embodiment, the substitute sound is not limited thereto.

In the directionality control system according to the modification example, sound data transmitted from microphone array device MB through network NW is subjected to mask processing, and thus it is possible to safely transmit the sound data without the leakage of information in spite of tapping occurring on the way. In this case, attached information indicating that the mask processing has been performed may be added to the header of the sound data, and a side having received the sound data by the addition can immediately know that the sound data has been subjected to the mask processing. The attached information may include time information, positional information, and the like.

As described above, the exemplary embodiments have been described with reference to the accompanying drawings, but it is needless to say that the invention is not limited to such examples. It would be apparent for those skilled in the technical field to which the invention belongs that various modification examples or corrected examples are conceivable within the scope of the technical idea recited in the claims, and it would be understood that these fall within the technical scope of the invention.

For example, in the above-described exemplary embodiments, in a case where a sound position of a sound detected by the microphone array device is within a privacy area, a sound detected in image capture area SA is necessarily subjected to mask processing (a substitute sound, anacoustic processing, and the like), but the mask processing may not be performed depending on users. For example, it is also possible to adopt a configuration in which mask processing is performed in a case where a user operating the directionality control device is a general user, and mask processing is not performed in a case where the user is a user, such as a manager, who has authority. It is possible to determine which user the user is in accordance with, for example, a user ID and the like when logging on the directionality control device.

Output control section 35 may perform voice change processing (processing) on the sound data of the sound collected by microphone array device MA. As an example of the voice change processing, for example, output control section 35 greatly changes the magnitude of a frequency (pitch) of the sound data of the sound collected by microphone array device MA. That is, the frequency of a sound which is output from speaker device 37 is changed to another frequency for making it difficult to know the contents of the sound, and thus it is possible to prevent the contents of the sound heard from privacy area from being known. Therefore, it is difficult to know the contents of the sound collected by microphone array device MA even when there is an attempt to know the contents of the sound. In this manner, output control section 35 performs processing on the sound collected by microphone array device MA and outputs the processed sound from speaker device 37, and thus it is possible to effectively protect the privacy of a subject (for example, a person) who is present within privacy area PRA.

Further, output control section 35 may expressly notify the user on the screen that a sound position corresponding to a position designated on the screen using the user's finger or a stylus pen is included in privacy area PRA.

(Third Exemplary Embodiment)

Figure 8:
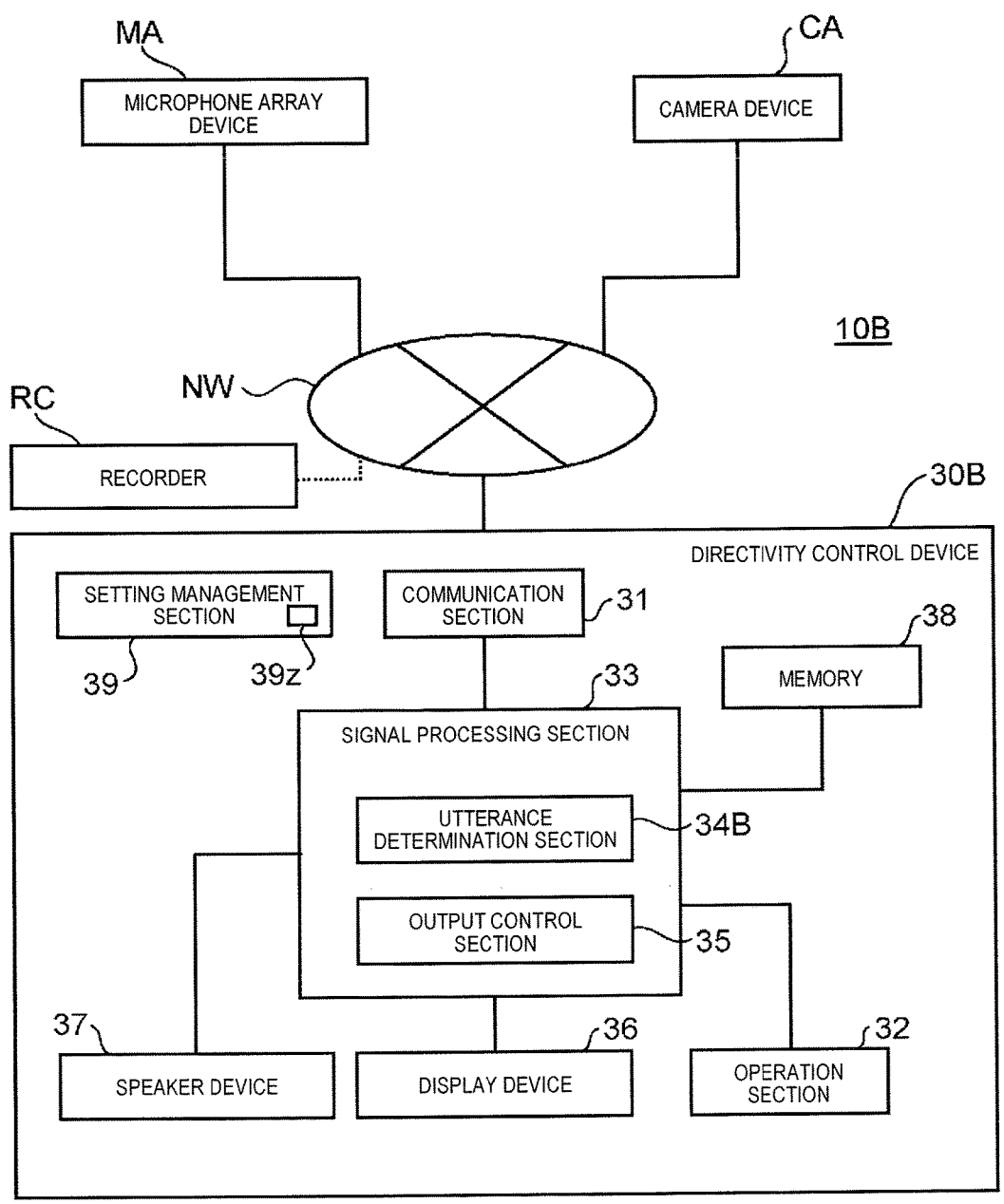
FIG. 8 is a system configuration diagram illustrating an example of an internal configuration of a directionality control system according to a third exemplary embodiment.

FIG. 8 is a system configuration diagram illustrating an example of an internal configuration of directionality control system 10B according to a third exemplary embodiment. Directionality control system 10B is configured to include camera device CA, microphone array device MA, directionality control device 30B, and recorder RC. Camera device CA, microphone array device MA, directionality control device 30B, and recorder RC are connected to each other so as to be capable of communicating data with each other through network NW. Network NW may be a wired network (for example, the Intranet or the Internet), or may be a wireless network (for example, a wireless Local Area Network (LAN)). Recorder RC, which is not an essential component, is provided in directionality control system 10B as necessary, and is required when a video captured in the past or a sound collected is used in directionality control device 30B.

Camera device CA as an example of an image capture section is, for example, an omnidirectional camera installed on an indoor ceiling, and functions as a monitoring camera capable of capturing an image of a space (image capture area) where the device is installed. Camera device CA is not limited to the omnidirectional camera, and may be a fixed camera having a fixed angle of view, or may be a Pan Tilt Zoom (PTZ) camera capable of performing panning rotation, tilting rotation, and zooming processing. Camera device CA stores video data and image capture time of the image capture area obtained by image capture in association with each other, and transmits the video data including the image capture time to directionality control device 30B and recorder RC through network NW on a regular basis. Camera device CA may transmit the video data including the image capture time when there has been a request from directionality control device 30B or recorder RC, in addition to transmitting the video data on a regular basis.

Microphone array device MA as an example of a sound collecting section is installed, for example, on an indoor ceiling and collects an omnidirectional sound in a space where the device is installed (that is, a sound collecting area). Here, the image capture area and the sound collecting area are substantially the same. Microphone array device MA has a housing, for example, having an opening formed in the center thereof, and further includes a plurality of microphone units that are concentrically disposed along a circumferential direction in the vicinity of the opening. Examples of the microphone unit (hereinafter, referred to as a microphone) to be used include a high sound quality small-sized Electret Condenser Microphone (ECM). Microphone array device MA stores sound data obtained through sound collecting in association with a sound collecting time, and transmits the sound data including the sound collecting time to directionality control device 30B and recorder RC through network NW on a regular basis. Microphone array device MA may transmit the sound data including the sound collecting time when there has been a request from directionality control device 30B or recorder RC, in addition to transmitting the sound data on a regular basis.

Directionality control device 30B is, for example, a stationary Personal Computer (PC) which is installed in a place other than the inside in which microphone array device MA and camera device CA are installed. Directionality control device 30B forms a main beam in a specific direction (that is, forms directionality) with respect to an omnidirectional sound (in other words, a non-directional sound) which is collected in microphone array device MA by using the sound data transmitted from microphone array device MA or recorder RC, to perform emphasis processing on the sound in the specific direction. In the third exemplary embodiment, a description has been given on the assumption that the sound emphasis processing is performed in directionality control device 30B, but the sound emphasis processing may be performed in the microphone array device instead of directionality control device 30B.

Directionality control device 30B detects and estimates the position of a sound source (hereinafter, also referred to as a "sound position") within the image capture area, and performs predetermined mask processing in a case where the estimated position of the sound source is within the range of a privacy area. Details of the mask processing will be described later. Directionality control device 30B may be a portable communication terminal such as a mobile phone, a tablet terminal, or a smartphone, instead of a PC.

Recorder RC as an example of a recording section is, for example, a storage device having a large storage capacity, and records the video data with the image capture time which is transmitted from camera device CA and the sound data with the sound collecting time which is transmitted from microphone array device MA in association with each other. In a case where video data and sound data recorded in the past (for example, captured and collected one day ago) are reproduced by directionality control device 30B, recorder RC transmits the video data with the image capture time and the sound data with the sound collecting time to directionality control device 30B in response to a request from directionality control device 30B based on the user's operation.

(Details of Configuration of Directionality Control Device in Third Exemplary Embodiment)

Directionality control device 30B is configured to include at least communication section 31, operation section 32, signal processing section 33, display device 36, speaker device 37, memory 38, and setting management section 39. Signal processing section 33 includes utterance determination section 34B and output control section 35.

Setting management section 39 as an example of a position setting section holds coordinates indicating a target designated by the user and coordinates indicating the position of a privacy area with respect to display device 36 on which a video of the image capture area captured by camera device CA is displayed, as initial setting. However, the coordinates of the target and the coordinates of the privacy area may be appropriately changed through the user's operation using operation section 32. In this case, the coordinates indicating the converted position are held in setting management section 39. A description will be given on the assumption that the target is mainly a person. However the target is not limited to a person, and may be, for example, an electronic equipment, a speaker, a vehicle, a robot, or the like.

When the target in the video displayed on display device 36 is designated by the user's finger or a stylus pen, setting management section 39 calculates and acquires coordinates indicating a direction (first direction) toward the target which corresponds to the designated position on display device 36 from microphone array device MA. Similarly, when a privacy area in the video displayed on display device 36 is designated by the user, setting management section 39 calculates and acquires coordinates indicating a direction (second direction) toward the central position of the privacy area which corresponds to the designated position (for example, the central position of the privacy area) on display device 36 from microphone array device MA.

In this calculation process, setting management section 39 calculates the coordinates indicating the first direction and the coordinates indicating the second direction as ($\theta$MAh1, $\theta$MAv1) and ($\theta$MAh2, $\theta$MAv2), respectively. Details of this coordinate calculation process are specifically described in, for example, PTL 1, and thus a description thereof will not be repeated. θMAh1 (θMAh2) denotes a horizontal angle in a first direction (second direction) toward the position of a target (privacy area) within the image capture area from microphone array device MA. θMAv1 (θMAv2) denotes a vertical angle in the first direction (second direction) toward the position of the target (privacy area) within the image capture area from microphone array device MA. This calculation process may be performed by signal processing section 33.

Setting management section 39 includes memory 39z, and stores positional coordinates of the target designated by the user and positional coordinates of the privacy area with respect to the video displayed on display device 36, and coordinates indicating a directing direction corresponding to each of the target and the privacy area from microphone array device MA in memory 39z.

Setting management section 39 sets predetermined sound pressure threshold value sh compared with sound pressure p of the sound collected by microphone array device MA in memory 39z. Here, sound pressure p indicates the magnitude of the sound collected by microphone array device MA, and is distinguished from a sound volume indicating the magnitude of a sound which is output from speaker device 37. Sound pressure threshold value sh is set to, for example, a value by which a user cannot hear the sound which is collected by microphone array device MA and is output from speaker device 37 or contents of the sound cannot be known even when the user can hear the sound.

Communication section 31 receives the video data with the image capture time transmitted from camera device CA or recorder RC and the sound data with the sound collecting time transmitted from microphone array device MA or recorder RC, and outputs the received data to signal processing section 33.

Operation section 32 is a user interface (UI) for notifying signal processing section 33 of contents of the user's input operation, and is constituted by a pointing device such as a mouse or a keyboard. For example, operation section 32 is disposed corresponding to a screen of display device 36, and may be constituted by a touch panel or a touch pad capable of performing an input operation by using the user's finger or a stylus pen.

When target area TA which is an object that the user desires to subjectively hear is designated by the user's operation in the video (FIGS. 10 to 12) of the image capture area displayed on display device 36, operation section 32 acquires coordinates indicating the designated position and outputs the acquired coordinates to signal processing section 33. Similarly, when privacy area PA not to be heard by the user for the purpose of privacy protection is designated by the user's operation in the video (FIGS. 10 to 12) of the image capture area displayed on display device 36, operation section 32 acquires coordinate data indicating the designated position and outputs the acquired coordinate data to signal processing section 33.

Memory 38 is constituted by, for example, a Random Access Memory (RAM), and functions as a program memory, a data memory, and a work memory during the operation of directionality control device 30B. Memory 38 stores the sound data of the sound collected by microphone array device MA in association with a sound collecting time, and stores video data of the image capture area captured by camera device CA in association with the image capture time. Although details will be described later, signal processing section 33 determines whether or not a sound has been detected within target area TA designated by the user or privacy area PA by using the sound data stored in memory 38. Therefore, the sound is reproduced with a slight delay from a sound collecting time of an actual sound collected by microphone array device MA. This delay time is a time required for a process of collecting a sound by microphone array device MA and then determining whether or not the sound has been detected within target area TA or privacy area PA. The sound data is stored in memory 38 for a fixed period of time, and thus signal processing section 33 can also control the output of the sound collected a predetermined time before the time when the sound in each of target area TA and privacy area PA is detected. In this manner, memory 38 also functions as a buffer memory that temporarily stores the sound data for the fixed period of time.

Memory 38 may store a masked sound (to be described later) which is prepared in advance.

Signal processing section 33 is constituted by, for example, a Central Processing Unit (CPU), a Micro Processing Unit (MPU), or a Digital Signal Processor (DSP), and performs a control process for controlling the overall operation of sections of directionality control device 30B, a process of inputting and outputting data to and from other sections, a data computation (calculation) process, and a data storage process.

Signal processing section 33 as an example of a sound emphasizing section forms a main beam having directionality in a directing direction toward a sound source position corresponding to a designated position in the video displayed on display device 36 from microphone array device MA, by using the sound data (in other words, the sound data for the fixed period of time which is collected by microphone array device MA) which is stored in memory 38. More specifically, signal processing section 33 forms directionality in each of the actual target and the actual privacy area (for example, a central position) which respectively correspond to target area TA and privacy area PA in the video displayed on display device 36 from microphone array device MA to perform emphasis processing on a sound of the target and a sound in the privacy area. Thereby, the sound of the target and the sound in the privacy area are emphasized, and thus are output as more clear sounds from speaker device 37.

Hereinafter, the sound of the target after the emphasis processing of signal processing section 33 will be referred to as an "emphasized sound of the target", and the sound in the privacy area after the emphasis processing of signal processing section 33 will be referred to as an "emphasized sound in the privacy area".

Utterance determination section 34B determines whether or not the target has uttered a sound on the basis of the emphasized sound of the target. Specifically, utterance determination section 34B calculates sound pressure p of the emphasized sound of the target, determines that utterance occurs from the target in a case where the sound pressure exceeds sound pressure threshold value sh stored in memory 39z, and determines that utterance does not occur from the target in a case where the sound pressure is equal to or less than sound pressure threshold value sh.

Utterance determination section 34B determines whether or not utterance has occurred in the privacy area, on the basis of the emphasized sound in the privacy area. Specifically, utterance determination section 34B calculates sound pressure p of the emphasized sound in the privacy area, determines that utterance occurs in the privacy area in a case where the sound pressure exceeds sound pressure threshold value sh stored in memory 39z, and determines that utterance does not occur in the privacy area in a case where the sound pressure is equal to or less than sound pressure threshold value sh. Utterance determination section 34B holds determination results indicating the presence or absence of utterance from the target and the presence or absence of utterance in the privacy area as utterance determination results (to be described later). Details of the operation of utterance determination section 34B will be described later.

Utterance determination section 34B may divide, for example, the image capture area into a plurality of blocks, may form the directionality of a sound for each block, and may determine whether utterance has occurred from the target or the privacy area in accordance with whether or not there is a sound having sound pressure p exceeding fixed sound pressure threshold value sh in each directing direction. A method in signal processing section 33 estimates a sound source is disclosed in, for example, literature of "a monograph "Localization of Multiple Sound Sources Based on CSP Analysis with a Microphone Array", Takanobu Nishiura and the like, The transactions of the Institute of Electronics, Information and Communication Engineers D-11, Vol. J83-D-11, No. 8, pp. 1713-1721, August 2000".

Output control section 35 controls the operations of camera device CA, microphone array device MA, display device 36, and speaker device 37, outputs the video data transmitted from camera device CA to display device 36, and outputs the sound data, which is transmitted from microphone array device MA, through speaker device 37.

Output control section 35 determines whether or not a masked sound is added to the emphasized sound of the target, in accordance with the utterance determination result of utterance determination section 34B. The used masked sound may be generated using, for example, the emphasized sound in privacy area PA, or may be a beep, a noise sound, a melody sound, or a combination thereof which is prepared in advance. Output control section 35 may convert the emphasized sound of the target into a predetermined substitute sound (for example, a beep, a noise sound, a melody sound, or the like) instead of adding the masked sound to the emphasized sound of the target, or may perform a mute output (that is, anacoustic processing). Details of the operation of output control section 35 will be described later.

Display device 36 as an example of a display section displays a video of the image capture area captured by camera device CA.

Speaker device 37 as an example of a sound output section outputs a sound of the sound data collected by microphone array device MA or the sound data having been subjected to the emphasis processing of signal processing section 33. Display device 36 and speaker device 37 may be configured as devices separate from directionality control device 30B.

A principle of the formation of directionality in a specific direction with respect to a sound collected by microphone array device MA is the same as that in the description related to FIG. 2 in the first exemplary embodiment. Also in directionality control device 30B, it is possible to realize the formation of directionality of sound data (that is, emphasis processing of sound data in a specific direction). In this case, directionality control device 30B may include at least delay devices 251, 252, . . . , 25 (n−1), and 25n and adder 26 illustrated in FIG. 2. That is, directionality control device 30B may apply a delay time corresponding to a difference in arrival time in microphones MA1, MA2, MA3, . . . , MA (n−1), and MAn to arrange phases of all sound waves, and then may add sound data after delay processing in adder 26.

Figure 9:
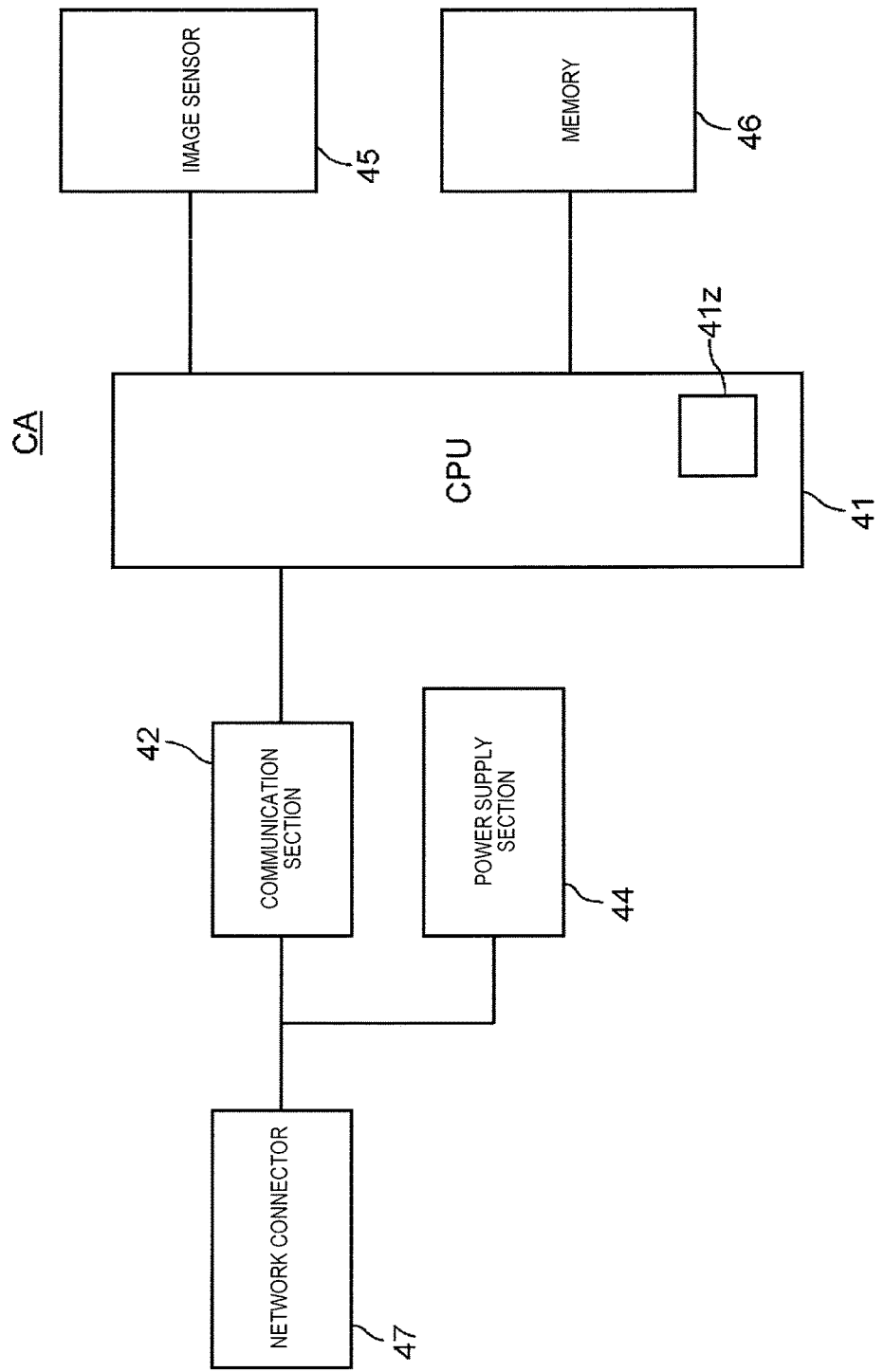
FIG. 9 is a block diagram illustrating an example of an internal configuration of a camera device.

FIG. 9 is a block diagram illustrating an example of an internal configuration of camera device CA. Camera device CA is configured to include at least CPU 41, communication section 42, power supplier 44, image sensor 45, memory 46, and network connector 47. In FIG. 9, a lens for forming incident light on image sensor 45 is not illustrated.

CPU 41 integrally controls the sections of camera device CA. CPU 41 may include motion detection section 41z that detects a motion of a person within image capture area SA, on the basis of images constituting a video captured by image sensor 45. A method of detecting the motion of the person includes various known techniques. For example, motion detection section 41z computationally calculates a difference between captured image frames, and detects a motion region as a motion of a person in a case where there is a motion region being within a range in which a ratio of a vertical length to a horizontal length is assumed to be a person, among motion regions obtained from the difference between the image frames.

Image sensor 45 captures an image of image capture area SA to acquire image data, and examples of the image sensor to be used include a Complementary Metal Oxide Semiconductor (CMOS) and a Charge Coupled Device (CCD).

Memory 46 is constituted by a Read Only Memory (ROM) that stores an operational program and data of a setting value in camera device CA, or a RAM that stores image data and work data. Memory 46 is connected to camera device CA so as to be freely inserted thereinto and extracted therefrom, and may be configured to further include a memory card that stores various data.

Communication section 42 is a network interface that controls data communication with network NW to which the communication section is connected through network connector 47.

Power supplier 44 supplies a DC power supply to each section of camera device CA, and supplies a DC power supply to an apparatus connected to network NW through network connector 47.

Network connector 47 is a connector capable of transmitting communication data such as image data and supplying power through a network cable.

Figure 10:
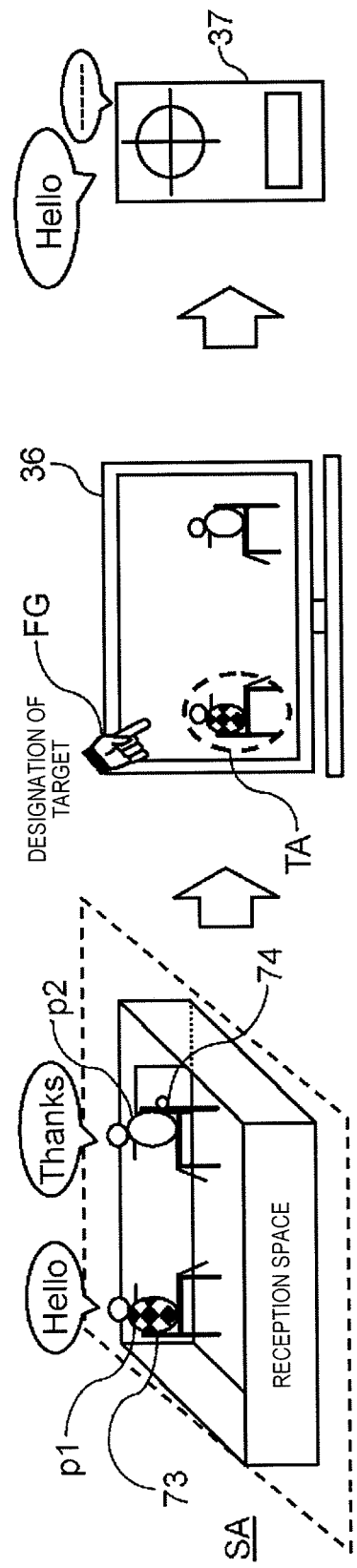
FIG. 10 is a diagram illustrating an example of a sound processing operation in a case of a long distance between person p2 at a designated position in a privacy area and target person p1, as a comparison example.
Figure 11:
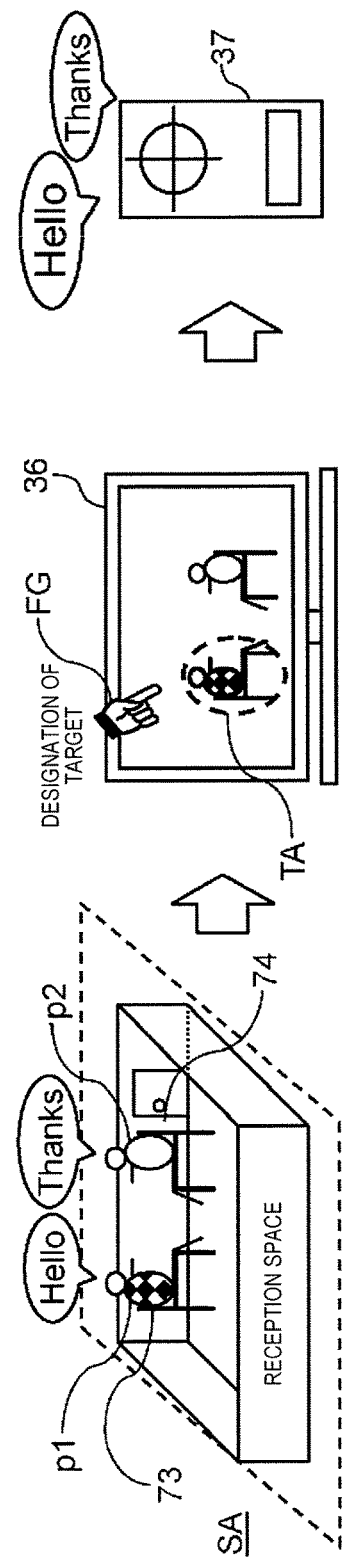
FIG. 11 is a diagram illustrating an example of a sound processing operation in a case of a short distance between person p2 at a designated position in a privacy area and target person p1, as a comparison example.
Figure 12:
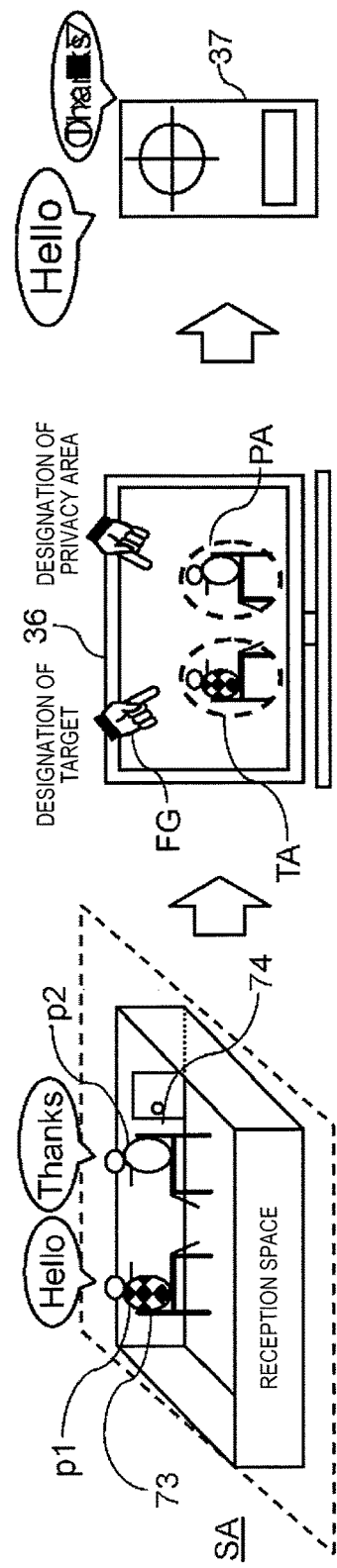
FIG. 12 is a diagram illustrating an example of a sound processing operation in a case of a short distance between person p2 at a designated position in a privacy area and target person p1 according to the third exemplary embodiment.

Next, an outline of a sound processing operation according to the third exemplary embodiment will be described with reference to FIGS. 10 to 12. FIG. 10 is a diagram illustrating an example of a sound processing operation in a case of a long distance between person p2 at a designated position in a privacy area and target person p1, as a comparison example. FIG. 11 is a diagram illustrating an example of a sound processing operation in a case of a short distance between person p2 at a designated position in a privacy area and target person p1, as a comparison example. FIG. 12 is a diagram illustrating an example of a sound processing operation in a case of a short distance between person p2 at a designated position in a privacy area and target person p1 according to the third exemplary embodiment. FIGS. 10 to 12 illustrate differences in the operation of sound output processing based on whether or not a privacy area has been designated, in a case where two speakers are present in a certain space. For example, person p1 is a sales clerk in a store, and person p2 is a customer in the store.

In FIGS. 10 to 12, image capture area SA captured by camera device CA is inside a reception space. In the reception space, two persons p1 and p2 have a conversation while facing each other in a state where the two persons sit on respective chairs 73 and 74. Person p1 sitting on chair 73 is designated as a target, and an area including person p2 sitting on chair 74 is designated as a privacy area. In other words, a sound of person p1 can be referred to as a target sound, and a sound of person p2 can be referred to as a sound of a person of which the privacy has to be protected.

In FIGS. 10 to 12, target area TA is designated by the operation of the user's finger FG in common to person p1 in the video displayed on display device 36, and thus an emphasized sound of the target (in other words, an emphasized sound of "Hello" uttered by person p1) is output from speaker device 37. Here, target area TA is designated so as to surround person p1. The designation of target area TA is not limited to designation using the user's finger FG, and may be performed by directly input positional coordinates indicating a range from a keyboard (not shown) or may be performed through image processing in which signal processing section 33 recognizes a specific face image seen in the video and sets a range surrounding the face image.

In FIG. 10, person p1 as a target and person p2 as an object of privacy protection sit down separately from each other. Accordingly, a sound uttered by person p2 does not leak into an emphasized sound of person p1 designated as a target, and a sound which is output from speaker device 37 is only the emphasized sound of person p1.

Next, in FIG. 11, a distance between person p1 as a target and person p2 as an object of privacy protection is shorter than that in FIG. 10. In this case, the sound uttered by person p2 (specifically, a sound of "Thanks") has leaked into or there is a strong possibility that the sound leaks into the emphasized sound of person p1 designated as a target. Therefore, contents of the sound uttered by person p2 of which the privacy has to be originally protected are output from speaker device 37, and thus it is not possible to properly protect the privacy of person p2.

Consequently, in the third exemplary embodiment, privacy area PA is designated by the operation of the user's finger FG together with target area TA as illustrated in FIG. 12. Although details will be described later, the masked sound is added to the emphasized sound (a sound of "Hello" in FIG. 12) of the target in a case where it is determined that utterance has occurred in privacy area PA, and the sound obtained by the addition is output from speaker device 37. Thereby, in a case where persons p1 and p2 are close to each other and have a conversation with each other, utterance contents of person p2 leaks into the emphasized sound of the target (that is, a sound obtained by performing emphasis processing on utterance contents of person p1), or there is an increasing possibility that utterance contents of person p2 leaks into the emphasized sound of the target. However, the output of the sound of person p2 from speaker device 37 is suppressed by the addition of the masked sound. In other words, only the sound of person p1 designated as a target is emphasized and output from speaker device 37, and the sound of person p2 is recognized by the user as a sound which is difficult to understand, and thus it is possible to properly protect the privacy of person p2.

(Details of Sound Processing in Directionality Control Device According to Third Exemplary Embodiment)

Figure 13:
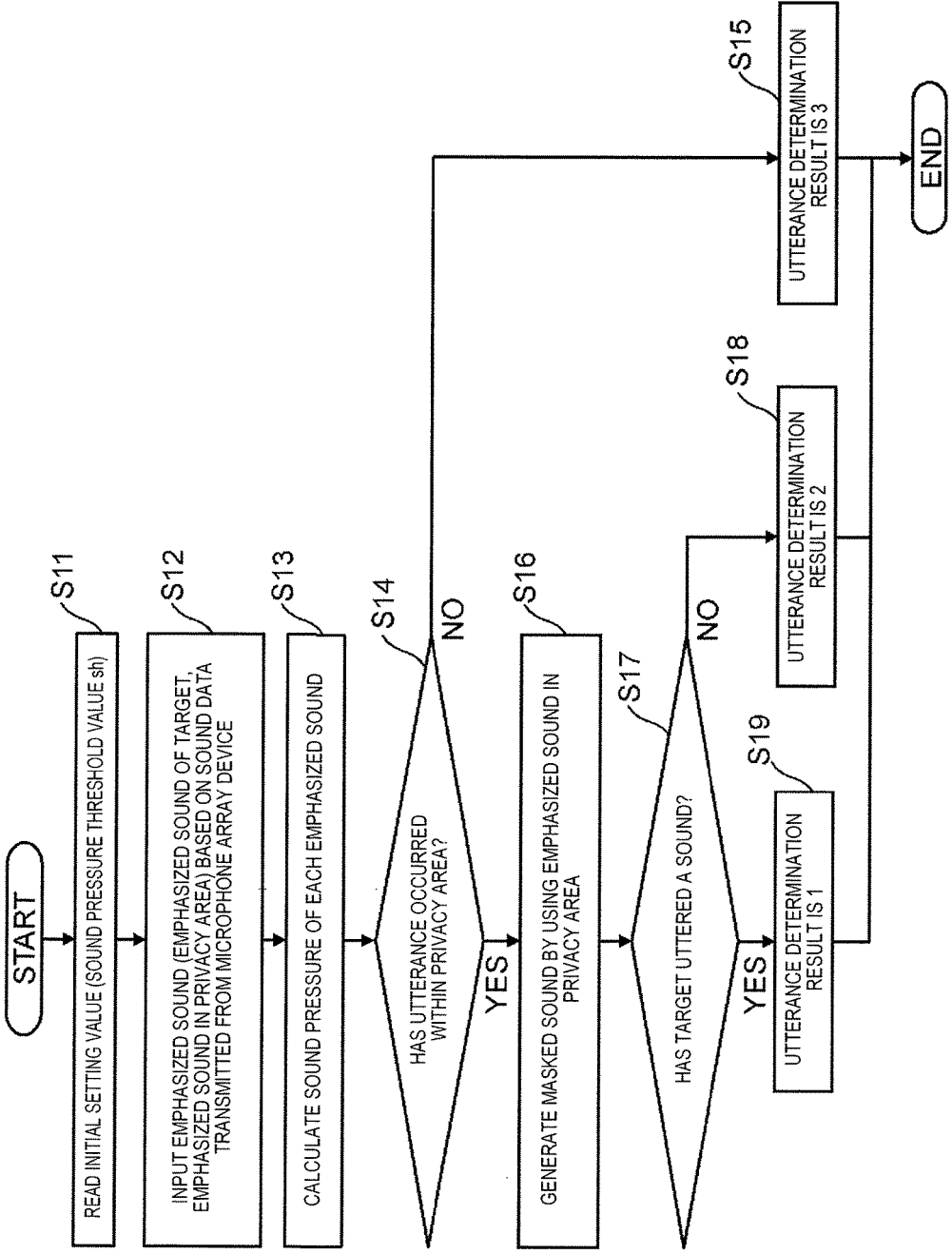
FIG. 13 is a flow chart illustrating an example of an operation procedure of utterance determination of a directionality control device according to the third exemplary embodiment.

FIG. 13 is a flow chart illustrating an example of an operation procedure of utterance determination of directionality control device 30B according to the third exemplary embodiment. As a premise of a description of FIG. 13, signal processing section 33 terminates the emphasis processing of a sound in a direction (first direction) toward person p1 corresponding to target area TA from microphone array device MA by using sound data transmitted from microphone array device MA or recorder RC. Similarly, signal processing section 33 terminates the emphasis processing of a sound in a direction (second direction) toward person p2 corresponding to privacy area PA from microphone array device MA by using sound data transmitted from microphone array device MA or recorder RC.

In FIG. 13, utterance determination section 34B reads an initial setting value held in setting management section 39 (S11). Specifically, utterance determination section 34B reads out sound pressure threshold value sh for determining whether or not the person in target area TA and privacy area PA has uttered a sound from memory 39z of setting management section 39 as the initial setting value to thereby acquire the initial setting value.

Utterance determination section 34B inputs the emphasized sound of the target and the emphasized sound in the privacy area based on the sound data transmitted from microphone array device MA (S12). Utterance determination section 34B calculates a sound pressure of the emphasized sound of the target which is input in step S12, and calculates a sound pressure of the emphasized sound in the privacy area which is input in step S12 (S13).

Utterance determination section 34B compares sound pressure p of the emphasized sound in the privacy area which is calculated in step S13 with sound pressure threshold value sh acquired in step S11 to determine whether or not the person (specifically, person p2 in FIG. 12) has uttered a sound within privacy area PA (S14). In a case where utterance determination section 34B determines that the person (specifically, person p2 in FIG. 12) has not uttered a sound within privacy area PA (in other words, sound pressure p of the emphasized sound in the privacy area is equal to or less than sound pressure threshold value sh) (S14, NO), the utterance determination section holds an utterance determination result=3 in memory 38 (S15). Thereby, the processing of utterance determination section 34B illustrated in FIG. 13 is terminated.

On the other hand, in a case where utterance determination section 34B determines that the person (specifically, person p2 in FIG. 12) has uttered a sound within privacy area PA (in other words, sound pressure p of the emphasized sound in the privacy area exceeds sound pressure threshold value sh) (S14, YES), the utterance determination section generates a masked sound by using the emphasized sound in the privacy area (S16). In the third exemplary embodiment, the masked sound is a sound added to the emphasized sound of the target, and is a mixed sound for making the utterance contents of person p2 unaware in order to protect the privacy of person p2 in privacy area PA (that is, in order to prevent the utterance contents of person p2 from being output from speaker device 37). A method of generating the masked sound may be any method of, for example, a generating method in which the emphasized sound in the privacy area is divided for each small time region (for example, 500 ms) in a dispersed manner, a generating method in which a sound is dispersed for each of phonemes constituting the sound instead of dividing the emphasized sound in the privacy area for each time region, a generating method in which a frequency characteristic of the emphasized sound in the privacy area is analyzed to reduce a sound pressure in a specific band, a generating method in which a plurality of uttered sounds collected in the past within the same privacy area are superimposed on each other, and the like, and all of the methods are known techniques.

Utterance determination section 34B compares sound pressure p of the emphasized sound of the target which is calculated in step S13 with sound pressure threshold value sh acquired in step S11 after step S16, to thereby determine whether or not the person (specifically, person p1 in FIG. 12)

has uttered a sound within target area TA (S17). In a case where utterance determination section 34B determines that the person (specifically, person p1 in FIG. 12) has not uttered a sound within target area TA (in other words, sound pressure p of the emphasized sound of the target is equal to or less than the sound pressure threshold value) (S17, NO), the utterance determination section holds an utterance determination result=2 in memory 38 (S18). Thereby, the processing of utterance determination section 34B illustrated in FIG. 13 is terminated.

On the other hand, in a case where utterance determination section 34B determines that the person (specifically, person p1 in FIG. 12) has uttered a sound within target area TA (in other words, sound pressure p of the emphasized sound of the target exceeds sound pressure threshold value sh) (S17, YES), the utterance determination section holds an utterance determination result=1 in memory 38 (S19). Thereby, the processing of utterance determination section 34B illustrated in FIG. 13 is terminated.

Figure 14:
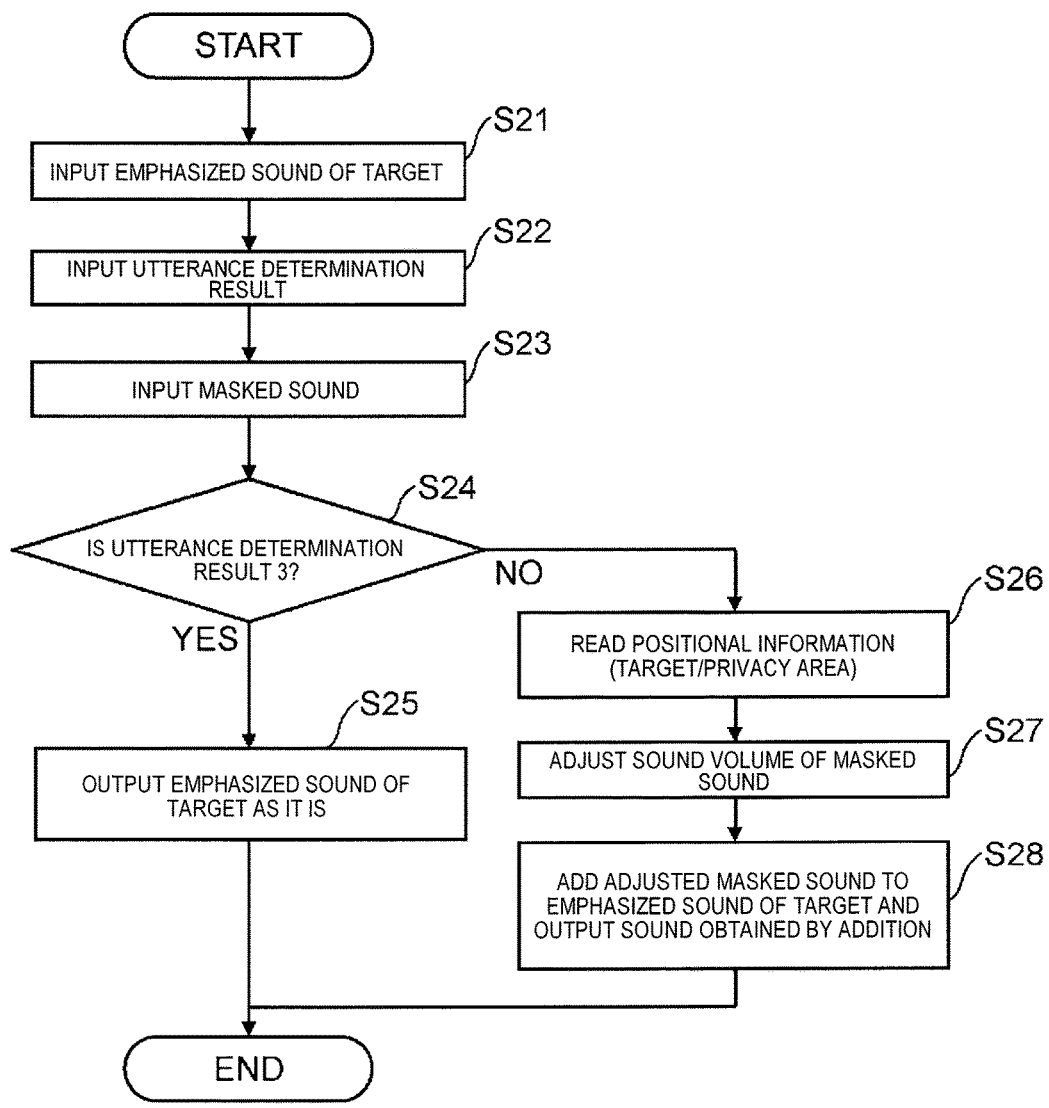
FIG. 14 is a flow chart illustrating an example of an operation procedure of sound output control (for example, masked sound addition) of the directionality control device according to the third exemplary embodiment.

FIG. 14 is a flow chart illustrating an example of an operation procedure of sound output control (for example, masked sound addition) of directionality control device 30B according to the third exemplary embodiment. Output control section 35 determines whether or not it is necessary to add a masked sound to the emphasized sound of the target by using an utterance determination result determined by utterance determination section 34B. As a premise of a description of FIG. 14, it is assumed that any utterance determination result is held in memory 38 by utterance determination section 34B illustrated in FIG. 13.

In FIG. 14, output control section 35 reads out the emphasized sound of the target from memory 38 and inputs the read-out emphasized sound (S21).

Output control section 35 reads out the utterance determination result from memory 38 and inputs the read-out utterance determination result (S22). Output control section 35 reads out the masked sound generated in step S16 and inputs the read-out masked sound (S23). In step S23, output control section 35 may read out a masked sound prepared in advance from memory 38 and may input the read-out masked sound from memory 38 instead of inputting the masked sound generated in step S16.

Output control section 35 determines whether or not the utterance determination result which is input in step S22 is 3 (S24). In a case where output control section 35 determines that the utterance determination result is 3 (S24, YES), person p2 has not uttered a sound in privacy area PA, and thus the output control section determines that it is not necessary to mask the emphasized sound of the target. That is, output control section 35 outputs the emphasized sound of the target which is input in step S21 as it is from speaker device 37 (S25).

On the other hand, in a case where output control section 35 determines that the utterance determination result is not 3 (S24, NO), person p2 has uttered a sound in privacy area PA, and thus the output control section determines that it is necessary to mask the emphasized sound of the target. Output control section 35 reads out and acquires coordinates indicating positional information of each of target area TA and privacy area PA which are held in memory 39z of setting management section 39 (S26).

In a case where output control section 35 determines that it is necessary to mask the emphasized sound of the target, the output control section adjusts the sound volume of the masked sound which is input in step S23, on the basis of the pieces of positional information of target area TA and privacy area PA which are acquired in step S26 (S27). Output control section 35 calculates and adjusts the sound volume of the masked sound on the basis of the position of the target and the position of the privacy area. More specifically, output control section 35 calculates angles formed in respective directions of the target and the privacy area with respect to a specific microphone (for example, microphone MA1) of microphone array device MA to presume a difference in the amount of attenuation of the sound volume between in a case of transmission from the target to microphone MA1 and in a case of transmission from the privacy area to microphone MA1, and calculates the sound volume of the masked sound based on the difference.

Output control section 35 may obtain an appropriate sound volume of the masked sound on the basis of a difference between the emphasized sound in the privacy area and the emphasized sound of the target when the utterance determination result is 2 (that is, when person p2 utters a sound within privacy area PA, but person p1 does not utter a sound within target area TA).

Output control section 35 adds the masked sound having the sound volume adjusted in step S27 to the emphasized sound of the target which is input in step S21 after step S27 to output the sound obtained by the addition from speaker device 37 (S28).

Figure 15:
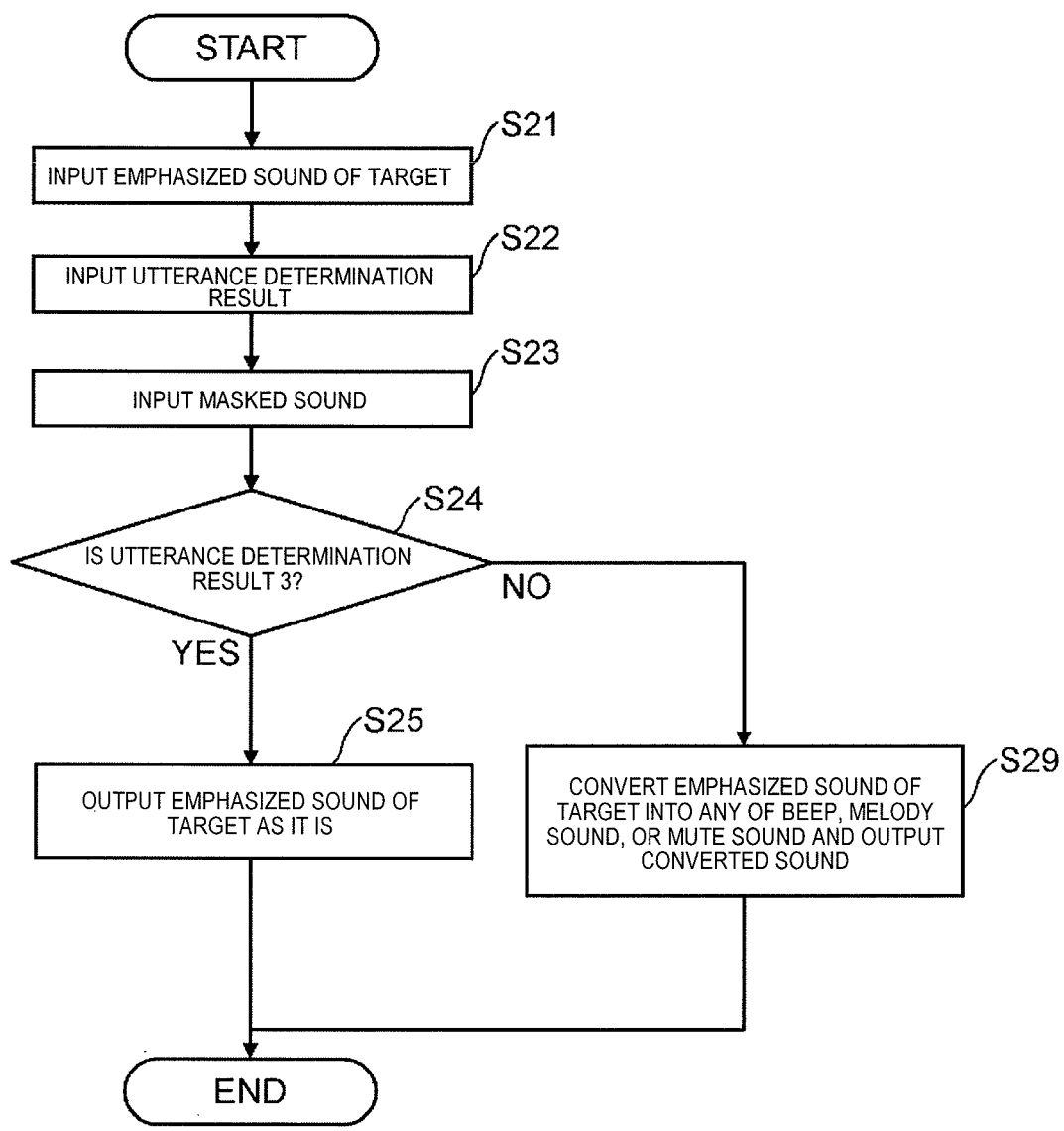
FIG. 15 is a flow chart illustrating an example of an operation procedure of sound output control (for example, substituting for another sound) of the directionality control device according to the third exemplary embodiment.
Figure 16:
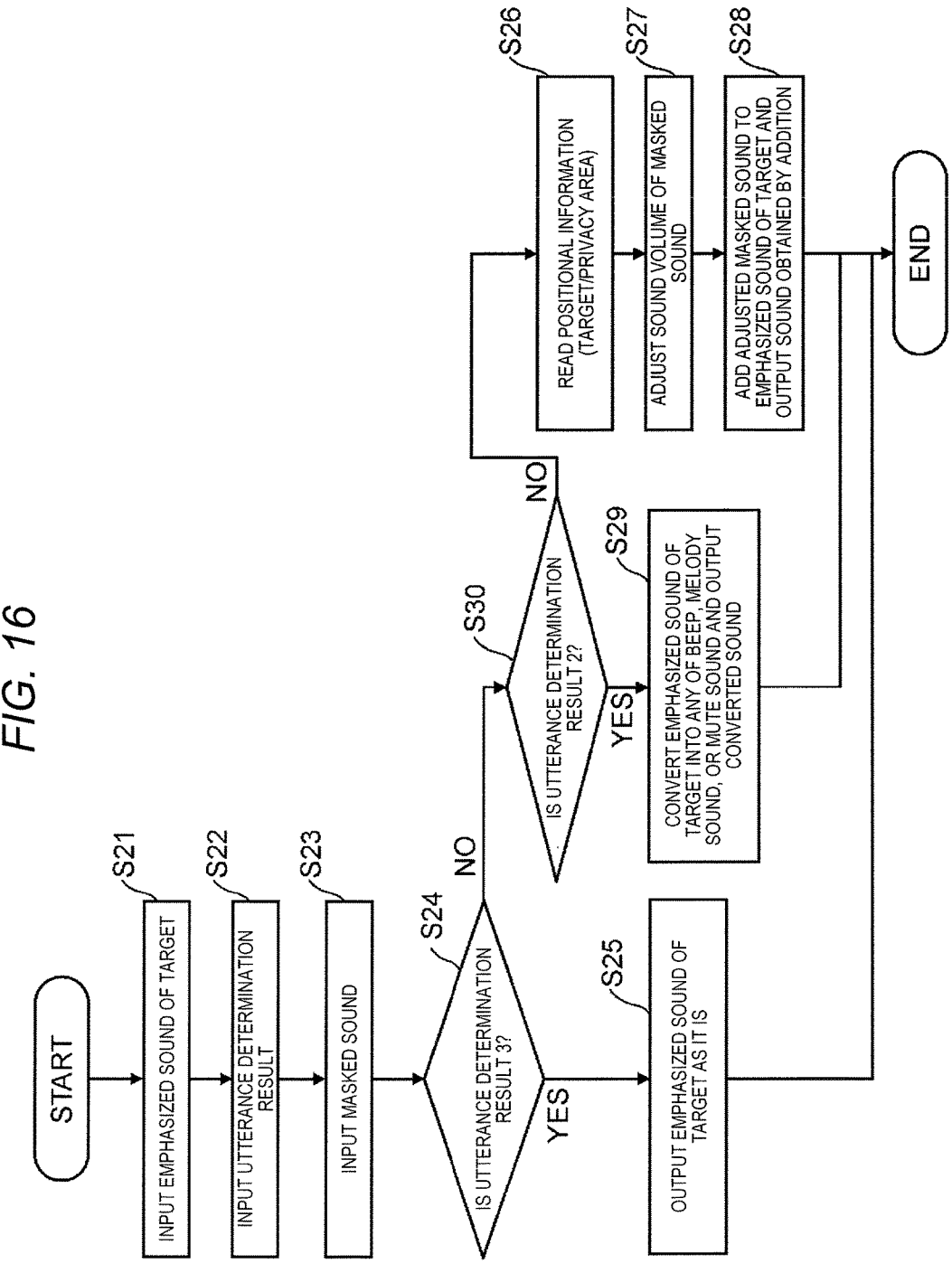
FIG. 16 is a flow chart illustrating an example of an operation procedure of sound output control (for example, a mute output) of the directionality control device according to the third exemplary embodiment.

FIG. 15 is a flow chart illustrating an example of an operation procedure of sound output control (for example, substituting for another sound) of directionality control device 30B according to the third exemplary embodiment. FIG. 16 is a flow chart illustrating an example of an operation procedure of sound output control (for example, a mute output) of directionality control device 30B according to the third exemplary embodiment. In descriptions of FIGS. 15 and 16, the same processes as the processes illustrated in FIG. 14 are denoted by the same step numbers, and thus a description thereof will not be repeated. Only different contents will be described.

In FIG. 15, in a case where output control section 35 determines that the utterance determination result is not 3 (S24, NO), person p2 has uttered a sound in privacy area PA, and thus the output control section determines that it is necessary to mask the emphasized sound of the target. Output control section 35 converts the emphasized sound of the target which is input in step S21 into any of a beep, a melody sound, or a mute output (that is, anacoustic processing) and outputs the sound from speaker device 37 (S29). That is, in the third exemplary embodiment, the masked sound may not be based on the emphasized sound in privacy area PA, or may be a beep (P sound), a melody sound, or the like which is prepared in advance. Thereby, a sound generated in the privacy area is never output from speaker device 37.

In FIG. 16, in a case where output control section 35 determines that the utterance determination result is not 3 (S24, NO), person p2 has uttered a sound in privacy area PA, and thus the output control section determines that it is necessary to mask the emphasized sound of the target. Further, output control section 35 determines whether or not the utterance determination result which is input in step S22 is 2 (S20).

In a case where output control section 35 determines that the utterance determination result is 2 (S20, YES), the emphasized sound of the target which is input in step S21 is converted into any one of a beep, a melody sound, and a mute output (that is, anacoustic processing) and is output from speaker device 37 (S29).

On the other hand, in a case where output control section 35 determines that the utterance determination result is not 2 (that is, the utterance determination result is 1) (S20, NO), person p2 has uttered a sound in privacy area PA, and thus the output control section determines that it is necessary to mask the emphasized sound of the target. That is, the processes of steps S26 to S28 illustrated in FIG. 14 are performed, and thus a detailed description thereof will not be repeated.

As described above, in directionality control system 10B according to the third exemplary embodiment, camera device CA captures an image of image capture area SA. Microphone array device MA collects a sound in image capture area SA. Display device 36 displays a video of image capture area SA captured by camera device CA. Speaker device 37 outputs a sound in image capture area SA which is collected by microphone array device MA. Setting management section 39 stores pieces of positional information of target area TA and privacy area PA which are designated with respect to the video data of the video area displayed on display device 36, in memory 39z.

Directionality control device 30B emphasizes the sound in the first direction toward the target from microphone array device MA to thereby generate the emphasized sound of the target by using the positional information of target area TA. Similarly, signal processing section 33 emphasizes the sound in the second direction toward the privacy area from microphone array device MA to thereby generate the emphasized sound in the privacy area by using the positional information of privacy area PA.

Directionality control device 30B determines whether or not utterance has occurred in each of the target and the privacy area on the basis of the emphasized sound of the target and the emphasized sound in the privacy area, and controls output in the emphasized sound of the target into which the sound in the privacy area has leaked, in a case where the directionality control device determines that utterance has occurred in at least the privacy area. For example, output control section 35 adds the masked sound to the emphasized sound of the target and outputs the sound from speaker device 37.

Thereby, even when a target person (for example, person p1 in FIG. 12) whom the user desires to hear is present in the vicinity of the privacy area, in other words, even when a sound of the person within the privacy area has leaked into an emphasized sound obtained by performing emphasis processing on a target sound in a case where at least the person within privacy area PA (for example, person p2 in FIG. 12) has uttered a sound, the masked sound is added to the emphasized sound of the target, and thus it is not possible to know contents of a sound uttered by the person within privacy area PA from the emphasized sound of the target. That is, according to directionality control system 10B of the third exemplary embodiment, even when a sound is uttered within the privacy area, the contents thereof is not known by another person, and the target sound is emphasized. Accordingly, it is possible to clearly hear the sound and to properly protect the privacy of the person within the privacy area. Since the masked sound is heard from speaker device 37 in a mixed state, the user having heard the mixed sound can know when the sound was uttered even when the user does not know the contents of the sound within privacy area PA.

Directionality control device 30B adds the masked sound to the emphasized sound of the target and outputs the sound from speaker device 37 in a case where sound pressure p of the emphasized sound in the privacy area exceeds sound pressure threshold value sh, and outputs the emphasized sound of the target as it is without performing addition of the masked sound in a case where sound pressure p is equal to or less than sound pressure threshold value sh. Thereby, in a case where the sound pressure of a sound is equal to or less than sound pressure threshold value sh even when the sound is uttered within the range of privacy area PA, the emphasized sound of the target is clearly output, and it is possible to reduce unnecessary processes such as a process of adding a masked sound and to reduce a processing load of directionality control device 30B.

In a case where directionality control device 30B determines that utterance has occurred in the privacy area, the directionality control device may convert the emphasized sound of the target into a predetermined substitute sound (for example, a beep, a melody sound, or a mute output) and may output the converted sound from speaker device 37, instead of adding a masked sound to the emphasized sound of the target. Thereby, since the emphasized sound of the target within image capture area SA changes to the substitute sound, it is also difficult to presume contents of a conversation between two persons from a sound uttered by a person (for example, target person p1) who is separated from privacy area PA, thereby increasing confidentiality.

Directionality control device 30B generates a masked sound by using the emphasized sound in the privacy area. Thereby, directionality control device 30B uses the emphasized sound in the privacy area, and thus it is possible to generate a highly accurate masked sound for erasing a sound in the privacy area into which the emphasized sound of the target has leaked.

Directionality control device 30B stores a masked sound in memory 38 in advance, and reads out the masked sound from memory 38 at the time of adding the masked sound to the emphasized sound of the target to thereby acquire the masked sound. Thereby, directionality control device 30B does not need to dynamically generate the masked sound by using the emphasized sound in the privacy area, and thus it is possible to reduce a load of addition processing with respect to the emphasized sound of the target.

Directionality control device 30B adjusts the sound volume of the masked sound which is added to the emphasized sound of the target on the basis of the pieces of positional information of the target and the privacy area. Thereby, directionality control device 30B can effectively predict the amount of attenuation of amplitude during the transmission of a sound on the basis of the position of the target and the position of the privacy area which are seen from microphone array device MA, and then can obtain an appropriate sound volume of the masked sound.

Directionality control device 30B stores a plurality of pieces of sound data, which were collected in the privacy area in the past, in memory 38, and adds the plurality of past collected sounds read out from memory 38 to the emphasized sound in the privacy area, to thereby generate the masked sound. Thereby, directionality control device 30B mixes a plurality of contents of a past conversation in a privacy area by giving consideration to the fact that the privacy area is a place where the contents of the conversation have to be concealed, and thus it is possible to obtain an appropriate masked sound for erasing the sound in the privacy area having leaked into the emphasized sound of the target.

Directionality control device 30B restricts the output of the emphasized sound of the target into which the sound in the privacy area has leaked. Thereby, directionality control device 30B properly protect the privacy of the person (for example, person p2 in FIG. 12) in privacy area PA since conversation contents of a person, having uttered a sound in the privacy area where the conversation contents have to be concealed, are never output from speaker device 37.

Directionality control device 30B performs processing on the emphasized sound of the target into which the sound in the privacy area has leaked, and outputs the processed sound. Thereby, directionality control device 30B can properly protect the privacy of the person (for example, person p2 in FIG. 12) in privacy area PA since all conversation contents of a person, having uttered a sound in the privacy area where the conversation contents have to be concealed, are switched to another sound and output from speaker device 37.

When directionality control device 30B receives an operation of designating privacy area PA from operation section 32 on the basis of the user's operation, the directionality control device sets coordinates of a position based on the designation operation to be positional information of the privacy area. Thereby, the user can arbitrarily set privacy area PA by designating privacy area PA so as to trace the screen with the user's finger FG or a stylus pen with respect to, for example, a video captured by camera device CA.

Directionality control device 30B stores a sound in image capture area SA which is collected by microphone array device MA in memory 38 together with a sound collecting time. Directionality control device 30B controls the output of a sound which is collected from a predetermined time before the time when the sound is detected in privacy area PA and is stored in memory 38. Thereby, the output of the sound in directionality control device 30B is controlled from the predetermined time before the sound is detected from privacy area PA, and thus it is possible to prevent a beginning portion (opening portion) of the sound within privacy area PA from being output without being subjected to mask processing for a short period of time (for example, for several seconds of approximately three seconds) which is required for processing from the detection of the sound to the output of the masked sound within privacy area PA. Therefore, it is also possible to avoid contents being presumed from the beginning portion of the sound. This case is effective in post reproduction in which collected sound data is once stored in memory 38 and is then reproduced, or in a case where a sound is reproduced with a slight delay (a delay from real time) from the sound collecting time of the sound collected by microphone array device MA. The predetermined time is a short period of time (for example, for several seconds of approximately three seconds) which is required from when microphone array device MA collects a sound to when it is determined whether or not the sound has been detected within the privacy area.

(Modification Example According to Third Exemplary Embodiment)

In the above-described third exemplary embodiment, directionality control device 30B stores positional information (that is, positional coordinates) of a target and a privacy area, and adds a masked sound to an emphasized sound of the target, substitutes the emphasized sound of the target for a predetermined substitute sound, or performs anacoustic processing in a case where it is determined that utterance has occurred in the privacy area. In a modification example of the third exemplary embodiment (hereinafter, simply referred to as a "modification example"), a description will be given of a case where these processes are performed by a microphone array device instead of directionality control device 30B.

FIG. 17 is a block diagram illustrating an example of an internal configuration of microphone array device MB in a modification example according to the third exemplary embodiment. In microphone array device MB according to the modification example, the same components as those in microphone array device MA in the above-described third exemplary embodiment are denoted by the same reference numerals and signs, and thus a description thereof will not be repeated.

Microphone array device MB is configured to include plurality of microphones MB1, MB2, . . . , and MBn, amplifiers 231, 232, . . . , and 23n, A/D converters 241, 242, 243, . . . , and 24n, CPU 25, encoding section 28, and communication section 29.

Amplifiers 231, 232, . . . , and 23n amplify sound signals collected by plurality of microphones MB1, MB2, . . . , and MBn.

A/D converters 241, 242, 243, . . . , and 24n convert the sound signals amplified by respective amplifiers 231, 232, . . . , and 23n into digital sound data.

CPU 25 collects sounds by plurality of microphones MB1, MB2, . . . , and MBn, inputs the pieces of sound data converted by A/D converters 241, 242, 243, . . . , and 24n, and performs various sound output processing on the basis of the pieces of sound data. CPU 25 stores the pieces of sound data collected by plurality of microphones MB1, MB2, . . . , and MBn in an internal memory (not shown) in association with a sound collecting time.

For example, when target area TA and privacy area PA are designated by the user, CPU 25 receives the pieces of positional information of the target and the privacy area which are transmitted from directionality control device 30B in communication section 29. Further, CPU 25 emphasizes a sound in a direction toward the target from microphone array device MB or emphasizes a sound in a direction toward the privacy area from microphone array device MB by using the pieces of positional information of the target and the privacy area, with respect to the pieces of sound data which are collected by microphones MB1, MB2, . . . , and MBn and are converted by A/D converters 241, 242, 243, . . . , and 24n.

When an utterance determination result in utterance determination section 34B is transmitted from directionality control device 30B, CPU 25 receives the utterance determination result in communication section 29 and stores the received utterance determination result in the internal memory (not shown). In a case where the utterance determination result stored in the internal memory is not 3 (that is, in a case where the utterance determination result is 1 or 2), CPU 25 adds the above-described masked sound to the emphasized sound in the direction toward the target from microphone array device MB, substitutes the emphasized sound of the target for a predetermined substitute sound, or performs anacoustic processing. The addition of the masked sound, the substituting for the predetermined substitute sound, and the anacoustic processing in CPU 25 are the same as the processes of output control section 35 in the above-described third exemplary embodiment, and thus a detailed description will not be repeated.

Encoding section 28 encodes the sound data which is output from CPU 25 to generate a sound packet capable of being transmitted through network NW.

Communication section 29 transmits the sound data encoded by encoding section 28 to directionality control device 30B through network NW. Communication section 29 receives various information transmitted from directionality control device 30B through network NW. Various pieces of information include, for example, positional information of the target and the privacy area and the utterance determination result in utterance determination section 34B.

As described above, microphone array device MB according to the modification example stores collected sound data in association with a sound collecting time, and transmits the stored sound data and data of the sound collecting time to directionality control device 30B through network NW. When the utterance determination result in the directionality control device 30B is received from directionality control device 30B, microphone array device MB adds the above-described masked sound to the emphasize sound in the direction toward the target from microphone array device MB, substitutes the emphasize sound of the target for a predetermined substitute sound, or performs anacoustic processing in a case where the received utterance determination result is not 3.

Microphone array device MB according to the modification example is used, and thus the sound data transmitted to directionality control device 30B from microphone array device MB has already been subjected to mask processing, substituted for a substitute sound, or subjected to anacoustic processing in microphone array device MB. Accordingly, it is possible to safely transmit the sound data without the leakage of a sound of a person within the privacy area in spite of tapping occurring on the way. In this case, attached information indicating that the mask processing has been performed may be added to the header of the sound data, and a side having received the sound data by the addition can immediately know that the sound data has been subjected to the mask processing. The attached information may include time information, positional information, and the like.

As described above, the exemplary embodiments have been described with reference to the accompanying drawings, but it is needless to say that the invention is not limited to such examples. It would be apparent for those skilled in the technical field to which the invention belongs that various modification examples or corrected examples are conceivable within the scope of the technical idea recited in the claims, and it would be understood that these fall within the technical scope of the invention.

For example, in the above-described exemplary embodiment, in a case where a sound position of a sound detected by the microphone array device is within a privacy area, a sound detected in image capture area SA is necessarily subjected to mask processing (addition of a masked sound), but the mask processing may not be performed depending on users. Output control section 35 can perform mask processing, for example, in a case where a user operating directionality control device 30B is a general user, and can cause mask processing not to be performed in a case where the user is a user, such as a manager, who has authority. It is possible to determine which user the user is in accordance with, for example, a user ID and the like when logging on directionality control device 30B. This is the same also in the substituting for a substitute sound and the anacoustic processing without being limited to execution of mask processing and non-execution of mask processing in accordance with the user's authority.

Output control section 35 may perform voice change processing (processing) on the sound data of the sound collected by microphone array device MA. As an example of the voice change processing, for example, output control section 35 greatly changes the magnitude of a frequency (pitch) of the sound data of the sound collected by microphone array device MA. That is, the frequency of a sound which is output from speaker device 37 is changed to another frequency for making it difficult to know the contents of the sound, and thus it is possible to prevent the contents of the sound heard from privacy area from being known. Therefore, it is difficult to know the contents of the sound collected by microphone array device MA even when there is an attempt to know the contents of the sound. In this manner, output control section 35 performs processing on the sound collected by microphone array device MA and outputs the processed sound from speaker device 37, and thus it is possible to effectively protect the privacy of a subject (for example, a person) who is present within privacy area PA.

Further, output control section 35 may expressly notify the user on the screen that a sound position corresponding to a position designated on the screen using the user's finger or a stylus pen is included in privacy area PA. For example, the user can visually or sensuously recognize a position designated as a privacy area by the user in accordance with a notification through a pop-up screen or a predetermined notification sound or the like from speaker device 37.

Industrial Applicability

This disclosure is useful as a directionality control system and a sound output control method for suppressing a deterioration of a person's privacy protection without making another person know contents of a sound uttered by a person within a privacy area even when the sound is uttered by the person.

REFERENCE MARKS IN THE DRAWINGS 10A, 10B DIRECTIONALITY CONTROL SYSTEM
21 HOUSING
25 CPU
26 ADDER
28 ENCODING SECTION
29 COMMUNICATION SECTION
30A, 30B DIRECTIONALITY CONTROL DEVICE
31 COMMUNICATION SECTION
32 OPERATION SECTION
33 SIGNAL PROCESSING SECTION
34A SOUND PRESSURE CALCULATION SECTION
34B UTTERANCE DETERMINATION SECTION
35 OUTPUT CONTROL SECTION
36 DISPLAY DEVICE
37 SPEAKER DEVICE
38 MEMORY
39 SETTING MANAGEMENT SECTION
39z MEMORY
71 RECEPTION SPACE
73, 74 CHAIR
80 SOUND SOURCE
231, 232, . . . , and 23n AMPLIFIER
241, 242, 243, . . . , and 24n A/D CONVERTER
251, 252, 253, . . . , and 25n DELAY DEVICE
CA CAMERA DEVICE
FG FINGER
NW NETWORK
MA, MB MICROPHONE ARRAY DEVICE
MA1, MA2, . . . , and MAn, MB1, MB2, . . . , and MBn MICROPHONE
p1, p2 PERSON
RC RECORDER

The invention claimed is:
1. A directionality control system, comprising:
a camera that images a video of an image capture area and that is installed in a room;
a sound collector that collects a sound in the image capture area and that is installed in the room;

a display that displays video data in the image capture area that is captured by the camera and that is installed outside of the room;

a sound outputter that outputs the sound in the image capture area that is collected by the sound collector and that is installed outside of the room;

a first memory that stores positional information of a sound masking area, which is part of the image capture area, and which is designated with respect to the video data of the image capture area, that is displayed on the display;

a detector that detects a sound source of the sound in the image capture area that is collected by the sound collector; and an output controller that determines whether or not the sound source of the sound is within a range of the sound masking area, wherein the output controller controls output of the sound by the sound outputter in the image capture area, which is collected by the sound collector to mask the sound so that content of the sound cannot be heard, in a case where the sound source detected by the detection section is within a range of the sound masking area, wherein the output controller causes the sound outputter to output the sound that is collected by the sound collector as it is, in a case where the sound source detected by the detector is outside of the range of the sound masking area, and wherein the display displays the video data in the image capture area, including the privacy area, without video masking.

2. The directionality control system of claim 1,
wherein in a case where the sound source detected by the detector is within the range of the privacy area, the output controller controls the output by the sound outputter when a sound pressure of the sound in the image capture area, which is collected by the sound collector, exceeds a threshold value, and omits the control of the output by the sound outputter when sound pressure of the sound in the image capture area which is collected by the sound collector, does not exceed the threshold value.

3. The directionality control system of claim 1,
wherein the output controller substitutes a predetermined substitute for the sound collected by the sound collector and outputs the substituted sound from the sound outputter.

4. The directionality control system of claim 1,
wherein the output controller restricts the output of the sound collected by the sound collector.

5. The directionality control system of claim 1,
wherein the output controller performs processing on the sound collected by the sound collector and outputs the processed sound.

6. The directionality control system of claim 1, further comprising:
a positional information setter that sets coordinates of a designated position as the positional information of the privacy area in accordance with an operation of designating the privacy area with respect to the display.

7. The directionality control system of claim 1, further comprising:
a second memory that stores the sound in the image capture area which is collected by the sound collector together with a sound collecting time,
wherein the output controller controls the output of the sound by the sound outputter which is collected from a predetermined time before a time when the sound source is detected and is stored in the second memory, in a case where the sound source detected by the detector is within the range of the privacy area.

8. The directionality control system of claim 1,
wherein the first memory further stores positional information of a target designated with respect to the video data of the image capture area which is displayed on the display,
wherein the detector includes
a sound emphasizer that emphasizes a sound in a first direction toward the target from the sound collector and emphasizes a sound in a second direction toward the privacy area from the sound collector by using the pieces of positional information of the target and the privacy area, and
an utterance determiner that determines whether or not utterance has occurred in each of the target and the privacy area, on the basis of the sound in the first direction and the sound in the second direction, which are emphasized by the sound emphasizer.

9. The directionality control system of claim 8,
wherein the output controller adds a masked sound to the emphasized sound in the first direction toward the target, and outputs the sound obtained by the addition, in a case the utterance determiner determines that utterance has occurred in the privacy area.

10. The directionality control system of claim 9,
wherein the output controller generates the masked sound on the basis of the sound in the second direction, which is emphasized by the sound emphasizer.

11. The directionality control system of claim 10,
wherein the first memory stores a plurality of sounds collected in the privacy area in the past, and
wherein the output controller adds the plurality of past collected sounds read out from the first memory to the emphasized sound in the second direction which is emphasized by the sound emphasizer to thereby generate the masked sound.

12. The directionality control system of claim 9,
wherein the masked sound is stored in the first memory in advance, and
wherein the output controller reads out the masked sound from the first memory and acquires the read-out masked sound.

13. The directionality control system of claim 9,
wherein the output controller adjusts a sound volume of the masked sound on the basis of the pieces of positional information of the target and the privacy area.

14. The directionality control system of claim 8,
wherein the output controller restricts the output of the sound in the first direction into which the sound in the privacy area has leaked.

15. The directionality control system of claim 8,
wherein the output controller performs processing on the sound in the first direction into which the sound in the privacy area has leaked, and outputs the processed sound.

16. The directionality control system of claim 8, further comprising:
a position setter that sets coordinates of a designated position as the positional information of the privacy area in accordance with an operation of designating the privacy area with respect to the display.

17. The directionality control system of claim 8,
wherein the first memory stores the sound in the image capture area which is collected by the sound collector together with a sound collecting time, and
wherein the output controller controls the output of the sound in the image capture area which is stored in the first memory, on the basis of sound collecting performed in a predetermined time before a time when the sound is detected in the privacy area.

18. A sound output control method in a directionality control system including a camera and a sound collector, the sound output control method comprising:
 imaging a video of an image capture area by the camera that is installed in a room;
 collecting a sound in the image capture area by the sound collector that is installed in the room;
 displaying, on a display, video data in the image capture area that is captured by the camera, the display being installed outside of the room;
 outputting sound, by a sound outputter, sound in the image capture area that is collected by the sound collector, the sound outputter being installed outside the room;
 storing positional information of a sound masking area, which is part of the image capture area, and which is designated with respect to a display on which the video data of the image capture area is displayed, in a first memory;
 detecting, by a detector, a sound source of the sound in the image capture area that is collected by the sound collector;
 determining, by an output controller, whether or not the sound source of the sound is within range of the sound masking area, and
 controlling, by an output controller, output of the sound by the sound outputter in the image capture area, which is collected by the sound collector to mask the sound so that content of the sound cannot be heard in a case where the detected sound source is within a range of the sound masking area,
 wherein the output controller causes the sound outputter to output the sound that is collected by the sound collector as it is, in a case where the sound source detected by the detector is outside of the range of the sound masking area, and
 wherein the display displays the video data in the image capture area, including the privacy area, without video masking.

19. The sound output control method of claim 18, further comprising:
 storing positional information of a target designated with respect to the display on which the video data of the image capture area is displayed, in the first memory,
 wherein the detecting of the sound source of the sound in the image capture area which is collected by the sound collector includes
  emphasizing a sound in a first direction toward the target from the sound collector and emphasizing a sound in a second direction toward the privacy area from the sound collector by using the pieces of positional information of the target and the privacy area which are stored in the first memory, and
  determining whether or not utterance has occurred in each of the target and the privacy area, on the basis of the emphasized sound in the first direction and the emphasized sound in the second direction, and
 wherein output of the sound in the first direction into which the sound in the privacy area has leaked is controlled in a case where utterance has occurred in the privacy area, as the controlling of the output of the sound in the image capture area which is collected by the sound collector, in a case where the detected sound source is within the range of the privacy area.

\* \* \* \* \*